(12) United States Patent
Bruckman

(10) Patent No.: US 9,647,759 B2
(45) Date of Patent: May 9, 2017

(54) EFFICIENT MAPPING OF CPRI SIGNALS FOR SENDING OVER OPTICAL NETWORKS

(71) Applicant: IPLight Ltd., Petach Tikva (IL)

(72) Inventor: Leon Bruckman, Petah-Tikva (IL)

(73) Assignee: IPLIGHT LTD., Petach Tikva (IL)

( * ) Notice: Subject to any disclaimer, the term of this patent is extended or adjusted under 35 U.S.C. 154(b) by 261 days.

(21) Appl. No.: 14/569,857

(22) Filed: Dec. 15, 2014

(65) Prior Publication Data

US 2015/0180575 A1     Jun. 25, 2015

Related U.S. Application Data

(60) Provisional application No. 61/919,764, filed on Dec. 22, 2013, provisional application No. 61/973,605, filed on Apr. 1, 2014.

(51) Int. Cl.
*H04B 10/2575* (2013.01)
*H04L 7/00* (2006.01)
*H04J 3/16* (2006.01)

(52) U.S. Cl.
CPC ...... *H04B 10/25753* (2013.01); *H04J 3/1652* (2013.01); *H04L 7/0075* (2013.01)

(58) Field of Classification Search
None
See application file for complete search history.

(56) References Cited

U.S. PATENT DOCUMENTS

| | | | |
|---|---|---|---|
| 2007/0091896 A1* | 4/2007 | Liu | H04J 3/1617 370/395.5 |
| 2007/0116046 A1* | 5/2007 | Liu | H04J 3/1617 370/466 |
| 2009/0291681 A1* | 11/2009 | Hara | H04W 88/085 455/422.1 |
| 2012/0113972 A1 | 5/2012 | Liu et al. | |

(Continued)

FOREIGN PATENT DOCUMENTS

EP     2434661 A1     4/2010

OTHER PUBLICATIONS

International Application # PCT/IB2014/066962 dated Apr. 19, 2015.

(Continued)

*Primary Examiner* — Sulaiman Nooristany
(74) *Attorney, Agent, or Firm* — D. Kligler IP Services Ltd.

(57) ABSTRACT

A method for communication includes receiving in a first communication interface input frames, which include data symbols that were derived by encoding respective characters, and further include one or more synchronization symbols having no corresponding characters. The characters from the data symbols are recovered, and the recovered characters are transmitted to a second communication interface by mapping the characters into communication frames and discarding the synchronization symbols. The characters are extracted from the communication frames in the second communication interface by synchronizing to the input frames independently of the synchronization symbols. The input frames are reconstructed in the second communication interface, including the data symbols and the synchronization symbols, by re-encoding the extracted characters.

20 Claims, 12 Drawing Sheets

(56) References Cited

U.S. PATENT DOCUMENTS

2013/0100948 A1\* 4/2013 Irvine .................. H04J 3/0632
 370/350
2014/0241186 A1 8/2014 Garcia

OTHER PUBLICATIONS

Lanzani, C., "4G Mobile Networks: An Analysis of Spectrum Allocation, Software Radio Architectures and Interfacing Technology", Industrial PhD Thesis, Technical University of Denmark, 202 pages, Oct. 31, 2010.
IEEE Standard 802.3-2005, "Part 3: Carrier sense multiple access with collision detection 5 (CSMA/CD) access method and physical layer specifications", 387 pages, Dec. 12, 2005.
CPRI Specification, "Common Public Radio Interface (CPRI); Interface Specification", version 6.0, 128 pages, Aug. 30, 2013.
ITU-T—G.709/Y.1331, "Series G: Transmission Systems and Media, Digital Systems and Networks, Digital terminal equipments—General; Series Y: Global Information Infrastructure, Internet Protocol Aspects and Next-Generation Networks, Internet protocol aspects—Transport, Interfaces for the Optical Transport Network 15 (OTN)", Appendix VIII, pp. 222-225, Feb. 2012.
ITU-T G-series Recommendations—Supplement 56, "OTN Transport of CPRI signals, Series G: Transmission Systems and Media, Digital Systems and Networks", 20 pages, Jul. 2015.
IEEE 802.3-2008, Telecommunications and information exchange between systems—Local and metropolitan area networks—Specific requirements Part 3: Carrier Sense Multiple Access with Collision Detection (CSMA/CD) Access Method and Physical 20 Layer Specifications, 315 pages, Dec. 26, 2008.
ITU-T G.7041/Y.1303—Telecommunication Standardization Sector of ITU, G.7041/Y.1303, Series G: Transmission Systems and Media, Digital Systems and Networks Data over Transport—Generic aspects—General Series Y: Global Information Infrastructure, Internet Protocol Aspects and Next-Generation Networks—Internet protocol aspects—Transport—Generic framing procedure Recommendation, 82 pages, Apr. 2011.

\* cited by examiner

| | 15 | 16 | 17 | 18 | 19 | 20 | 21 | 22 | 23 | 24 | ... | 38 | 39 | 40 | 41 | ....... | 3823 | 3824 |
|---|---|---|---|---|---|---|---|---|---|---|---|---|---|---|---|---|---|---|
| 1 | | BFP1 | CH1 | CH2 | CH3 | CH4 | CH5 | CH6 | CH7 | CH8 | | CH22 | CH23 | CH24 | CH1 | | CH15 | CH16 |
| 2 | | BFP2 | CH17 | CH18 | CH19 | CH20 | CH21 | CH22 | CH23 | CH24 | | | | | | | | |
| 3 | | BFP3 | | | | | | | | | | | | | | | | |
| 4 | PSI | 0x00 | | | | | | | | | | | | | | | CH15 | CH16 |
| 1 | | BFP4 | CH17 | CH18 | CH19 | CH20 | CH21 | CH22 | CH23 | CH24 | | | | | | | | |
| 2 | | BFP5 | | | | | | | | | | | | | | | | |
| 3 | | BFP6 | | | | | | | | | | | | | | | | |
| 4 | PSI | 0x01 | | | | | | | | | | | | | | | CH7 | CH8 |
| 1 | | BFP7 | CH9 | CH10 | CH11 | CH12 | CH13 | CH14 | CH15 | CH16 | | | | | | | | |
| 2 | | BFP8 | | | | | | | | | | | | | | | | |
| 3 | | BFP9 | | | | | | | | | | | | | | | | |
| 4 | PSI | 0x02 | | | | | | | | | | | | | | | CH23 | CH24 |
| 1 | | BFP10 | CH1 | CH2 | CH3 | CH4 | CH5 | CH6 | CH7 | CH8 | | CH22 | CH23 | CH24 | CH1 | | CH15 | CH16 |
| 2 | | BFP11 | CH17 | CH18 | CH19 | CH20 | CH21 | CH22 | CH23 | CH24 | | | | | | | | |
| 3 | | BFP12 | | | | | | | | | | | | | | | | |
| 4 | PSI | 0x03 | | | | | | | | | | | | | | | CH15 | CH16 |
| 1 | | BFP13 | CH17 | CH18 | CH19 | CH20 | CH21 | CH22 | CH23 | CH24 | | | | | | | | |
| 2 | | BFP14 | | | | | | | | | | | | | | | | |
| 3 | | BFP15 | | | | | | | | | | | | | | | | |
| 4 | PSI | 0x04 | | | | | | | | | | | | | | | CH7 | CH8 |
| 1 | | BFP16 | CH9 | CH10 | CH11 | CH12 | CH13 | CH14 | CH15 | CH16 | | | | | | | | |
| 2 | | BFP17 | | | | | | | | | | | | | | | | |
| 3 | | BFP18 | | | | | | | | | | | | | | | | |
| 4 | PSI | 0x05 | | | | | | | | | | | | | | | CH23 | CH24 |
| 1 | | BFP19 | CH1 | CH2 | CH3 | CH4 | CH5 | CH6 | CH7 | CH8 | | CH22 | CH23 | CH24 | CH1 | | CH15 | CH16 |
| 2 | | BFP20 | CH17 | CH18 | CH19 | CH20 | CH21 | CH22 | CH23 | CH24 | | | | | | | | |
| 3 | | BFP21 | | | | | | | | | | | | | | | | |
| 4 | PSI | 0x06 | | | | | | | | | | | | | | | CH15 | CH16 |
| 1 | | BFP22 | CH17 | CH18 | CH19 | CH20 | CH21 | CH22 | CH23 | CH24 | | | | | | | | |
| 2 | | BFP23 | | | | | | | | | | | | | | | | |
| 3 | | BFP24 | | | | | | | | | | | | | | | | |
| 4 | PSI | 0x07 | | | | | | | | | | | | | | | CH7 | CH8 |
| 1 | | | CH9 | CH10 | CH11 | CH12 | CH13 | CH14 | CH15 | CH16 | | | | | | | | |
| 2 | | | | | | | | | | | | | | | | | | |
| 3 | | | | | | | | | | | | | | | | | | |
| 4 | PSI | 0x08 | | | | | | | | | | | | | | | CH23 | CH24 |

MAPPING 24 OPTION-1 CPRI CHANNELS INTO OPU2  *FIG. 4*

|   | 15 | 16 | 17 | 18 | 19 | 20 | 21 | 22 | 23 | 24 | ... | 38 | 39 | 40 | 41 | ...... | 3823 | 3824 |
|---|----|----|----|----|----|----|----|----|----|----|-----|----|----|----|----|--------|------|------|
| 1 |    | BFP1 | CH1 | CH2 | CH3 | CH4 | CH5 | CH6 | CH7 | CH8 |   | CH10 | CH11 | CH12 | CH1 |   | CH3 | CH4 |
| 2 |    | BFP2 | CH5 | CH6 | CH7 | CH8 | CH9 | CH10 | CH1 | CH212 |  |  |  |  |  |  |  |  |
| 3 |    | BFP3 |  |  |  |  |  |  |  |  |  |  |  |  |  |  |  |  |
| 4 | PSI | 0x00 |  |  |  |  |  |  |  |  |  |  |  |  |  |  | CH3 | CH4 |
| 1 |    | BFP4 | CH5 | CH6 | CH7 | CH8 | CH9 | CH10 | CH11 | CH212 |  |  |  |  |  |  |  |  |
| 2 |    | BFP5 |  |  |  |  |  |  |  |  |  |  |  |  |  |  |  |  |
| 3 |    | BFP6 |  |  |  |  |  |  |  |  |  |  |  |  |  |  |  |  |
| 4 | PSI | 0x01 |  |  |  |  |  |  |  |  |  |  |  |  |  |  | CH7 | CH8 |
| 1 |    | BFP7 | CH9 | CH10 | CH11 | CH12 | CH1 | CH2 | CH3 | CH4 |  |  |  |  |  |  | CH3 | CH4 |
| 2 |    | BFP8 |  |  |  |  |  |  |  |  |  |  |  |  |  |  |  |  |
| 3 |    | BFP9 |  |  |  |  |  |  |  |  |  |  |  |  |  |  |  |  |
| 4 | PSI | 0x02 |  |  |  |  |  |  |  |  |  |  |  |  |  |  | CH11 | CH12 |
| 1 |    | BFP10 | CH1 | CH2 | CH3 | CH4 | CH5 | CH6 | CH7 | CH8 |  | CH10 | CH11 | CH12 | CH1 |  |  |  |
| 2 |    | BFP11 | CH5 | CH6 | CH7 | CH8 | CH9 | CH10 | CH11 | CH212 |  |  |  |  |  |  |  |  |
| 3 |    | BFP12 |  |  |  |  |  |  |  |  |  |  |  |  |  |  |  |  |
| 4 | PSI | 0x03 |  |  |  |  |  |  |  |  |  |  |  |  |  |  | CH3 | CH4 |
| 1 |    |    | CH5 | CH6 | CH7 | CH8 | CH9 | CH10 | CH11 | CH212 |  |  |  |  |  |  |  |  |
| 2 |    |    |  |  |  |  |  |  |  |  |  |  |  |  |  |  |  |  |
| 3 |    |    |  |  |  |  |  |  |  |  |  |  |  |  |  |  |  |  |
| 4 | PSI | 0x04 |  |  |  |  |  |  |  |  |  |  |  |  |  |  | CH7 | CH8 |
| 1 |    |    | CH9 | CH10 | CH11 | CH12 | CH1 | CH2 | CH3 | CH4 |  |  |  |  |  |  |  |  |
| 2 |    |    |  |  |  |  |  |  |  |  |  |  |  |  |  |  |  |  |
| 3 |    |    |  |  |  |  |  |  |  |  |  |  |  |  |  |  |  |  |
| 4 | PSI | 0x05 |  |  |  |  |  |  |  |  |  |  |  |  |  |  | CH11 | CH12 |
| 1 |    |    | CH1 | CH2 | CH3 | CH4 | CH5 | CH6 | CH7 | CH8 |  | CH10 | CH11 | CH12 | CH1 |  | CH3 | CH4 |
| 2 |    |    | CH5 | CH6 | CH7 | CH8 | CH9 | CH10 | CH11 | CH212 |  |  |  |  |  |  |  |  |
| 3 |    |    |  |  |  |  |  |  |  |  |  |  |  |  |  |  |  |  |
| 4 | PSI | 0x06 |  |  |  |  |  |  |  |  |  |  |  |  |  |  | CH3 | CH4 |
| 1 |    |    | CH5 | CH6 | CH7 | CH8 | CH9 | CH10 | CH11 | CH212 |  |  |  |  |  |  |  |  |
| 2 |    |    |  |  |  |  |  |  |  |  |  |  |  |  |  |  |  |  |
| 3 |    |    |  |  |  |  |  |  |  |  |  |  |  |  |  |  |  |  |
| 4 | PSI | 0x07 |  |  |  |  |  |  |  |  |  |  |  |  |  |  | CH7 | CH8 |
| 1 |    |    | CH9 | CH10 | CH11 | CH12 | CH1 | CH2 | CH3 | CH4 |  |  |  |  |  |  |  |  |
| 2 |    |    |  |  |  |  |  |  |  |  |  |  |  |  |  |  |  |  |
| 3 |    |    |  |  |  |  |  |  |  |  |  |  |  |  |  |  |  |  |
| 4 | PSI | 0x08 |  |  |  |  |  |  |  |  |  |  |  |  |  |  | CH11 | CH12 |

MAPPING 12 OPTION-2 CPRI CHANNELS INTO OPU2  *FIG. 5*

|   |   | 15 | 16 | 17 | 18 | 19 | 20 | 21 | 22 | 23 | 24 | ... | 38 | 39 | 40 | 41 | ... | 3823 | 3824 |
|---|---|---|---|---|---|---|---|---|---|---|---|---|---|---|---|---|---|---|---|
| 1 |   |   | BFP1 | CH1 | CH2 | CH3 | CH4 | CH5 | CH6 | CH1 | CH2 |   | CH4 | CH5 | CH6 | CH1 |   | CH3 | CH4 |
| 2 |   |   | BFP2 | CH5 | CH6 | CH1 | CH2 | CH3 | CH4 | CH5 | CH6 |   |   |   |   |   |   |   |   |
| 3 |   |   | BFP3 |   |   |   |   |   |   |   |   |   |   |   |   |   |   |   |   |
| 4 |   | PSI | 0x00 |   |   |   |   |   |   |   |   |   |   |   |   |   |   | CH3 | CH4 |
| 1 |   |   | BFP4 | CH5 | CH6 | CH1 | CH2 | CH3 | CH4 | CH5 | CH6 |   |   |   |   |   |   |   |   |
| 2 |   |   | BFP5 |   |   |   |   |   |   |   |   |   |   |   |   |   |   |   |   |
| 3 |   |   | BFP6 |   |   |   |   |   |   |   |   |   |   |   |   |   |   |   |   |
| 4 |   | PSI | 0x01 |   |   |   |   |   |   |   |   |   |   |   |   |   |   | CH1 | CH2 |
| 1 |   |   |   | CH3 | CH4 | CH5 | CH6 | CH1 | CH2 | CH3 | CH4 |   |   |   |   |   |   |   |   |
| 2 |   |   |   |   |   |   |   |   |   |   |   |   |   |   |   |   |   |   |   |
| 3 |   |   |   |   |   |   |   |   |   |   |   |   |   |   |   |   |   |   |   |
| 4 |   | PSI | 0x02 |   |   |   |   |   |   |   |   |   |   |   |   |   |   | CH5 | CH6 |
| 1 |   |   |   | CH1 | CH2 | CH3 | CH4 | CH5 | CH6 | CH71 | CH2 |   | CH4 | CH5 | CH6 | CH1 |   | CH3 | CH4 |
| 2 |   |   |   | CH5 | CH6 | CH1 | CH2 | CH3 | CH4 | CH5 | CH6 |   |   |   |   |   |   |   |   |
| 3 |   |   |   |   |   |   |   |   |   |   |   |   |   |   |   |   |   |   |   |
| 4 |   | PSI | 0x03 |   |   |   |   |   |   |   |   |   |   |   |   |   |   | CH3 | CH4 |
| 1 |   |   |   | CH5 | CH6 | CH1 | CH2 | CH3 | CH4 | CH5 | CH6 |   |   |   |   |   |   |   |   |
| 2 |   |   |   |   |   |   |   |   |   |   |   |   |   |   |   |   |   |   |   |
| 3 |   |   |   |   |   |   |   |   |   |   |   |   |   |   |   |   |   |   |   |
| 4 |   | PSI | 0x04 |   |   |   |   |   |   |   |   |   |   |   |   |   |   | CH1 | CH2 |
| 1 |   |   |   | CH3 | CH4 | CH5 | CH6 | CH1 | CH2 | CH3 | CH4 |   |   |   |   |   |   |   |   |
| 2 |   |   |   |   |   |   |   |   |   |   |   |   |   |   |   |   |   |   |   |
| 3 |   |   |   |   |   |   |   |   |   |   |   |   |   |   |   |   |   |   |   |
| 4 |   | PSI | 0x05 |   |   |   |   |   |   |   |   |   |   |   |   |   |   | CH5 | CH6 |
| 1 |   |   |   | CH1 | CH2 | CH3 | CH4 | CH5 | CH6 | CH1 | CH2 |   | CH4 | CH5 | CH6 | CH1 |   | CH3 | CH4 |
| 2 |   |   |   | CH5 | CH6 | CH1 | CH2 | CH3 | CH4 | CH5 | CH6 |   |   |   |   |   |   |   |   |
| 3 |   |   |   |   |   |   |   |   |   |   |   |   |   |   |   |   |   |   |   |
| 4 |   | PSI | 0x06 |   |   |   |   |   |   |   |   |   |   |   |   |   |   | CH3 | CH4 |
| 1 |   |   |   | CH5 | CH6 | CH1 | CH2 | CH3 | CH4 | CH5 | CH6 |   |   |   |   |   |   |   |   |
| 2 |   |   |   |   |   |   |   |   |   |   |   |   |   |   |   |   |   |   |   |
| 3 |   |   |   |   |   |   |   |   |   |   |   |   |   |   |   |   |   |   |   |
| 4 |   | PSI | 0x07 |   |   |   |   |   |   |   |   |   |   |   |   |   |   | CH1 | CH2 |
| 1 |   |   |   | CH3 | CH4 | CH5 | CH6 | CH1 | CH2 | CH3 | CH4 |   |   |   |   |   |   |   |   |
| 2 |   |   |   |   |   |   |   |   |   |   |   |   |   |   |   |   |   |   |   |
| 3 |   |   |   |   |   |   |   |   |   |   |   |   |   |   |   |   |   |   |   |
| 4 |   | PSI | 0x08 |   |   |   |   |   |   |   |   |   |   |   |   |   |   | CH5 | CH6 |

MAPPING 6 OPTION-3 CPRI CHANNELS INTO OPU2  FIG. 6

|    | 15  | 16   | 17  | 18  | 19  | 20  | 21  | 22  | 23  | 24  | ... | 38  | 39  | 40  | 41  | ....... | 3823 | 3824 |
|----|-----|------|-----|-----|-----|-----|-----|-----|-----|-----|-----|-----|-----|-----|-----|---------|------|------|
| 1  |     | BFP1 | CH1 | CH2 | CH3 | CH1 | CH2 | CH3 | CH1 | CH2 |     | CH1 | CH2 | CH3 | CH1 |         | CH3  | CH1  |
| 2  |     | BFP2 | CH2 | CH3 | CH1 | CH2 | CH3 | CH1 | CH2 | CH3 |     |     |     |     |     |         |      |      |
| 3  |     | BFP3 |     |     |     |     |     |     |     |     |     |     |     |     |     |         |      |      |
| 4  | PSI | 0x00 |     |     |     |     |     |     |     |     |     |     |     |     |     |         | CH3  | CH1  |
| 1  |     |      | CH2 | CH3 | CH1 | CH2 | CH3 | CH1 | CH2 | CH3 |     |     |     |     |     |         |      |      |
| 2  |     |      |     |     |     |     |     |     |     |     |     |     |     |     |     |         |      |      |
| 3  |     |      |     |     |     |     |     |     |     |     |     |     |     |     |     |         |      |      |
| 4  | PSI | 0x01 |     |     |     |     |     |     |     |     |     |     |     |     |     |         | CH1  | CH2  |
| 1  |     |      | CH3 | CH1 | CH2 | CH3 | CH1 | CH2 | CH3 | CH1 |     |     |     |     |     |         |      |      |
| 2  |     |      |     |     |     |     |     |     |     |     |     |     |     |     |     |         |      |      |
| 3  |     |      |     |     |     |     |     |     |     |     |     |     |     |     |     |         |      |      |
| 4  | PSI | 0x02 |     |     |     |     |     |     |     |     |     |     |     |     |     |         | CH2  | CH3  |
| 1  |     |      | CH1 | CH2 | CH3 | CH1 | CH2 | CH3 | CH1 | CH2 |     | CH1 | CH2 | CH3 | CH1 |         | CH3  | CH1  |
| 2  |     |      | CH2 | CH3 | CH1 | CH2 | CH3 | CH1 | CH2 | CH3 |     |     |     |     |     |         |      |      |
| 3  |     |      |     |     |     |     |     |     |     |     |     |     |     |     |     |         |      |      |
| 4  | PSI | 0x03 |     |     |     |     |     |     |     |     |     |     |     |     |     |         | CH3  | CH1  |
| 1  |     |      | CH2 | CH3 | CH1 | CH2 | CH3 | CH1 | CH2 | CH3 |     |     |     |     |     |         |      |      |
| 2  |     |      |     |     |     |     |     |     |     |     |     |     |     |     |     |         |      |      |
| 3  |     |      |     |     |     |     |     |     |     |     |     |     |     |     |     |         |      |      |
| 4  | PSI | 0x04 |     |     |     |     |     |     |     |     |     |     |     |     |     |         | CH1  | CH2  |
| 1  |     |      | CH3 | CH1 | CH2 | CH3 | CH1 | CH2 | CH3 | CH1 |     |     |     |     |     |         |      |      |
| 2  |     |      |     |     |     |     |     |     |     |     |     |     |     |     |     |         |      |      |
| 3  |     |      |     |     |     |     |     |     |     |     |     |     |     |     |     |         |      |      |
| 4  | PSI | 0x05 |     |     |     |     |     |     |     |     |     |     |     |     |     |         | CH2  | CH3  |
| 1  |     |      | CH1 | CH2 | CH3 | CH1 | CH2 | CH3 | CH1 | CH2 |     | CH1 | CH2 | CH3 | CH1 |         | CH3  | CH1  |
| 2  |     |      | CH2 | CH3 | CH1 | CH2 | CH3 | CH1 | CH2 | CH3 |     |     |     |     |     |         |      |      |
| 3  |     |      |     |     |     |     |     |     |     |     |     |     |     |     |     |         |      |      |
| 4  | PSI | 0x06 |     |     |     |     |     |     |     |     |     |     |     |     |     |         | CH3  | CH1  |
| 1  |     |      | CH2 | CH3 | CH1 | CH2 | CH3 | CH1 | CH2 | CH3 |     |     |     |     |     |         |      |      |
| 2  |     |      |     |     |     |     |     |     |     |     |     |     |     |     |     |         |      |      |
| 3  |     |      |     |     |     |     |     |     |     |     |     |     |     |     |     |         |      |      |
| 4  | PSI | 0x07 |     |     |     |     |     |     |     |     |     |     |     |     |     |         | CH1  | CH2  |
| 1  |     |      | CH3 | CH1 | CH2 | CH3 | CH1 | CH2 | CH3 | CH1 |     |     |     |     |     |         |      |      |
| 2  |     |      |     |     |     |     |     |     |     |     |     |     |     |     |     |         |      |      |
| 3  |     |      |     |     |     |     |     |     |     |     |     |     |     |     |     |         |      |      |
| 4  | PSI | 0x08 |     |     |     |     |     |     |     |     |     |     |     |     |     |         | CH2  | CH3  |

MAPPING 3 OPTION-5 CPRI CHANNELS INTO OPU2    *FIG. 7*

| | | 15 | 16 | 17 | 18 | 19 | 20 | 21 | 22 | 23 | 24 | ... | 38 | 39 | 40 | 41 | ...... | 3823 | 3824 |
|---|---|---|---|---|---|---|---|---|---|---|---|---|---|---|---|---|---|---|---|
| 1 | 1 | | BFP1 | CH1 | CH2 | CH3 | CH4 | CH5 | CH6 | CH1 | CH2 | | CH4 | CH5 | CH6 | CH1 | | CH3 | CH4 |
| | 2 | | BFP2 | CH5 | CH6 | CH1 | CH2 | CH3 | CH4 | CH5 | CH6 | | | | | | | | |
| | 3 | | BFP3 | | | | | | | | | | | | | | | | |
| | 4 | PSI | 0x00 | | | | | | | | | | | | | | | CH3 | CH4 |
| 2 | 1 | | BFP4 | CH5 | CH6 | CH1 | CH2 | CH3 | CH4 | CH5 | CH6 | | | | | | | | |
| | 2 | | BFP5 | | | | | | | | | | | | | | | | |
| | 3 | | BFP6 | | | | | | | | | | | | | | | | |
| | 4 | PSI | 0x01 | | | | | | | | | | | | | | | CH1 | CH2 |
| 3 | 1 | | | CH3 | CH4 | CH5 | CH6 | CH1 | CH2 | CH3 | CH4 | | | | | | | | |
| | 2 | | | | | | | | | | | | | | | | | | |
| | 3 | | | | | | | | | | | | | | | | | | |
| | 4 | PSI | 0x02 | | | | | | | | | | | | | | | CH5 | CH6 |
| 4 | 1 | | | CH1 | CH2 | CH3 | CH4 | CH5 | CH6 | CH7 | CH2 | | CH4 | CH5 | CH6 | CH1 | | CH3 | CH4 |
| | 2 | | | CH5 | CH6 | CH1 | CH2 | CH3 | CH3 | CH5 | CH6 | | | | | | | | |
| | 3 | | | | | | | | | | | | | | | | | | |
| | 4 | PSI | 0x03 | | | | | | | | | | | | | | | CH3 | CH4 |
| 5 | 1 | | | CH5 | CH6 | CH1 | CH2 | CH3 | CH4 | CH5 | CH6 | | | | | | | | |
| | 2 | | | | | | | | | | | | | | | | | | |
| | 3 | | | | | | | | | | | | | | | | | | |
| | 4 | PSI | 0x04 | | | | | | | | | | | | | | | CH1 | CH2 |
| 6 | 1 | | | CH3 | CH4 | CH5 | CH6 | CH1 | CH2 | CH3 | CH4 | | | | | | | | |
| | 2 | | | | | | | | | | | | | | | | | | |
| | 3 | | | | | | | | | | | | | | | | | | |
| | 4 | PSI | 0x05 | | | | | | | | | | | | | | | CH5 | CH6 |
| 7 | 1 | | | CH1 | CH2 | CH3 | CH4 | CH5 | CH6 | CH1 | CH2 | | CH4 | CH5 | CH6 | CH1 | | CH3 | CH4 |
| | 2 | | | CH5 | CH6 | CH1 | CH2 | CH3 | CH4 | CH5 | CH6 | | | | | | | | |
| | 3 | | | | | | | | | | | | | | | | | | |
| | 4 | PSI | 0x06 | | | | | | | | | | | | | | | CH3 | CH4 |
| 8 | 1 | | | CH5 | CH6 | CH1 | CH2 | CH3 | CH4 | CH5 | CH6 | | | | | | | | |
| | 2 | | | | | | | | | | | | | | | | | | |
| | 3 | | | | | | | | | | | | | | | | | | |
| | 4 | PSI | 0x07 | | | | | | | | | | | | | | | CH1 | CH2 |
| 9 | 1 | | | CH3 | CH4 | CH5 | CH6 | CH1 | CH2 | CH3 | CH4 | | | | | | | | |
| | 2 | | | | | | | | | | | | | | | | | | |
| | 3 | | | | | | | | | | | | | | | | | | |
| | 4 | PSI | 0x08 | | | | | | | | | | | | | | | CH5 | CH6 |

EXAMPLE OF SETTING BFPn FOR CPRI OPTION-3    *FIG. 8*

| | | 15 | 16 | 17 | 18 | 19 | 20 | 21 | 22 | 23 | 24 | ... | 399 | 400 | 401 | 402 | ...... | 3823 | 3824 |
|---|---|---|---|---|---|---|---|---|---|---|---|---|---|---|---|---|---|---|---|
| MULTI-FRAME | 1 | | | 0-1 | 0-2 | 0-3 | 0-4 | 0-5 | 0-6 | 1-1 | 1-2 | | 63-5 | 63-6 | 0-1 | 0-2 | | 58-3 | 58-4 |
| | 2 | | | 58-5 | 58-6 | 59-1 | 59-2 | 59-3 | 59-4 | 59-5 | 59-6 | | | | | | | | |
| | 3 | | | | | | | | | | | | | | | | | | |
| | 4 | PSI | 0x00 | | | | | | | | | | | | | | | 42-3 | 42-4 |
| | 1 | | | 42-5 | 42-6 | 43-1 | 43-2 | 43-3 | 43-4 | 42-5 | 42-6 | | | | | | | | |
| | 2 | | | | | | | | | | | | | | | | | | |
| | 3 | | | | | | | | | | | | | | | | | | |
| | 4 | PSI | 0x01 | | | | | | | | | | | | | | | 21-1 | 21-2 |
| | 1 | | | 21-3 | 21-4 | 21-5 | 21-6 | 22-1 | 22-2 | 22-3 | 22-4 | | | | | | | | |
| | 2 | | | | | | | | | | | | | | | | | | |
| | 3 | | | | | | | | | | | | | | | | | | |
| | 4 | PSI | 0x02 | | | | | | | | | | | | | | | 63-5 | 63-6 |
| | 1 | | | 0-1 | 0-2 | 0-3 | 0-4 | 0-5 | 0-6 | 1-1 | 1-2 | | | | | | | | |
| | 2 | | | | | | | | | | | | | | | | | | |
| | 3 | | | | | | | | | | | | | | | | | | |
| | 4 | PSI | 0x00 | | | | | | | | | | | | | | | | |

ALIGNED MAPPING 6 OPTION-3 CPRI CHANNELS INTO OPU2   *FIG. 11*

| | | 15 | 16 | 17 | 18 | 19 | 20 | 21 | 22 | 23 | 24 | ... | 399 | 400 | 401 | 402 | ...... | 3823 | 3824 |
|---|---|---|---|---|---|---|---|---|---|---|---|---|---|---|---|---|---|---|---|
| MULTI-FRAME | 1 | | | 0-1 | 0-2 | 0-3 | 1-1 | 1-2 | 1-3 | 2-1 | 2-2 | | 127-2 | 127-3 | 0-1 | 0-2 | | 116-3 | 117-1 |
| | 2 | | | 117-2 | 117-3 | 118-1 | 118-2 | 118-3 | 119-1 | 119-2 | 119-3 | | | | | | | | |
| | 3 | | | | | | | | | | | | | | | | | | |
| | 4 | PSI | 0x00 | | | | | | | | | | | | | | | 84-3 | 85-1 |
| | 1 | | | 85-2 | 85-3 | 86-1 | 86-2 | 86-3 | 87-1 | 87-2 | 87-3 | | | | | | | | |
| | 2 | | | | | | | | | | | | | | | | | | |
| | 3 | | | | | | | | | | | | | | | | | | |
| | 4 | PSI | 0x01 | | | | | | | | | | | | | | | 42-1 | 42-2 |
| | 1 | | | 42-3 | 43-1 | 43-2 | 43-3 | 44-1 | 44-2 | 44-3 | 45-1 | | | | | | | | |
| | 2 | | | | | | | | | | | | | | | | | | |
| | 3 | | | | | | | | | | | | | | | | | | |
| | 4 | PSI | 0x02 | | | | | | | | | | | | | | | 127-2 | 127-3 |
| | 1 | | | 0-1 | 0-2 | 0-3 | 1-1 | 1-2 | 1-3 | 2-1 | 2-2 | | | | | | | | |
| | 2 | | | | | | | | | | | | | | | | | | |
| | 3 | | | | | | | | | | | | | | | | | | |
| | 4 | PSI | 0x00 | | | | | | | | | | | | | | | | |

ALIGNED MAPPING 3 OPTION-5 CPRI CHANNELS INTO OPU2   *FIG. 12*

EFFICIENT MAPPING OF CPRI SIGNALS FOR SENDING OVER OPTICAL NETWORKS

CROSS-REFERENCE TO RELATED APPLICATIONS

This application claims the benefit of U.S. Provisional Patent Application 61/919,764, filed Dec. 22, 2013, and U.S. Provisional Patent Application 61/973,605, filed Apr. 1, 2014, whose disclosures are incorporated herein by reference.

FIELD OF THE INVENTION

The present disclosure relates generally to communication networks, and particularly to methods and systems for efficient delivery of CPRI signals over an optical network.

BACKGROUND OF THE INVENTION

Various communication networks comprise multiple Base Transmission Stations (BTSs) that transmit and receive Radio Frequency (RF) signals to and from mobile devices using one or more antennas. In various network configurations, the BTS communicates the RF signals with other elements in the network in a sampled and digitized form. For example, the Common Public Radio Interface (CPRI) standard defines interfaces between Radio Equipment Controllers (REC) and local or remote Radio Equipment (RE) units of the BTSs. The CPRI specifications are described, for example, in "Common Public Radio Interface (CPRI); Interface Specification," version 6.0, Aug. 30, 2013, whose disclosure is incorporated herein by reference.

In various applications, CPRI signals are transmitted as 10-bit symbols using an encoding scheme that maps 8-bit characters to the 10-bit symbols (referred to as 8b/10b encoding). An 8b/10b line coding scheme is defined, for example, in IEEE Standard 802.3-2005, entitled "IEEE Std 802.3-2005: Part 3: Carrier sense multiple access with collision detection (CSMA/CD) access method and physical layer specifications," Dec. 12, 2005, whose disclosure is incorporated herein by reference.

CPRI signals may be sent over various types of networks, such as, for example, optical networks. Several schemes for sending CPRI signals over the Optical Transport Network (OTN) are described, for example, in Appendix VIII of ITU-T Recommendation G.709/Y.1331, entitled "Interfaces for the Optical Transport Network (OTN)," February, 2012, whose disclosure is incorporated herein by reference.

SUMMARY OF THE INVENTION

An embodiment of the present invention provides a method for communication, including receiving in a first communication interface input frames. The input frames include data symbols that were derived by encoding respective characters, and further include one or more synchronization symbols having no corresponding characters. The characters are recovered from the data symbols, and the recovered characters are transmitted to a second communication interface by mapping the characters into communication frames and discarding the synchronization symbols. The characters are extracted from the communication frames in the second communication interface by synchronizing to the input frames independently of the synchronization symbols. The input frames are reconstructed in the second communication interface, including the data symbols and the synchronization symbols, by re-encoding the extracted characters.

In some embodiments, the data symbols are carried in Common Public Radio Interface (CPRI) signals and are derived from eight-bit characters using an eight-bit to ten-bit (8b/10b) encoding protocol, and transmitting the recovered characters includes transmitting the communication frames, with the recovered characters mapped therein, over an optical communication network. In other embodiments, mapping the characters includes mapping the input frames to payload areas of the communication frames, and setting in overhead fields of the communication frames pointers to at least some of the mapped input frames. In yet other embodiments, synchronizing to the input frames includes identifying respective positions of the input frames within the payload areas of the communication frames using the pointers.

In an embodiment, receiving the input frames includes receiving multiple input frames that are organized in a hyper frame, and synchronizing to the input frames includes identifying an input frame carrying a Hyper Frame Number (HFN), and inferring a position of a first input frame in the hyper frame from a position of the identified input frame within the hyper frame. In another embodiment, identifying the input frame includes dividing the input frames into multiple interleaved sub-sequences each having an intra-frame spacing of a hyper-frame interval, and identifying a sub-sequence in which a field that is expected to contain the HFN increments monotonically and cyclically in a given integer range over two or more of the input frames. In yet another embodiment, receiving the input frames includes accepting the input frames from multiple CPRI sources, and mapping the characters includes interleaving the recovered characters using a predefined interleaving scheme that alternates among the CPRI sources.

In some embodiments, discarding the synchronization symbols includes setting in place of the synchronization symbols an alarm signal that indicates error events in the CPRI signal, and reconstructing the input frames includes reconstructing the input frames, including regenerating the synchronization symbols, when the alarm signal indicates no errors, and outputting a fault indication otherwise. In other embodiments, mapping the characters includes mapping the input frames aligned to boundaries of the communication frames, and synchronizing to the input frames includes extracting the characters from the communication frames starting at the boundaries.

In an embodiment, the method further includes deriving from opposite-direction communication frames received in the first communication interface a first clock signal, and transmitting the communication frames using the first clock. In another embodiment, the method further includes deriving from opposite-direction input frames accepted in the second communication interface a second clock signal, and outputting the reconstructed input frames using the second clock signal.

There is additionally provided, in accordance with an embodiment of the present invention, an apparatus for communication including first and second communication interfaces. The first communication interface is configured to receive input frames that include data symbols derived by encoding respective characters and that further include one or more synchronization symbols having no corresponding characters, to recover the characters from the data symbols, and to transmit the recovered characters by mapping the characters into communication frames and discarding the synchronization symbols. The second communication interface is configured to receive the communication frames from the first communication interface, to extract the characters from the communication frames by synchronizing to the input frames independently of the synchronization symbols, and to reconstruct the input frames, including the data symbols and the synchronization symbols, by re-encoding the extracted characters.

The present invention will be more fully understood from the following detailed description of the embodiments thereof, taken together with the drawings in which:

BRIEF DESCRIPTION OF THE DRAWINGS

FIGS. 4-7 are diagrams depicting tables for mapping CPRI channels into an OTN multi-frame for various CPRI rate options, in accordance with embodiments that are described herein;

FIG. 8 is a diagram depicting the usage of pointers to CPRI basic frames for synchronization, in accordance with an embodiment that is described herein;

FIGS. 11 and 12 are diagrams that schematically depict tables for aligned mapping of CPRI signals into an OTN multi-frame for two CPRI rate options, in accordance with embodiments that are described herein.

DETAILED DESCRIPTION OF EMBODIMENTS

Overview

Figure 1:
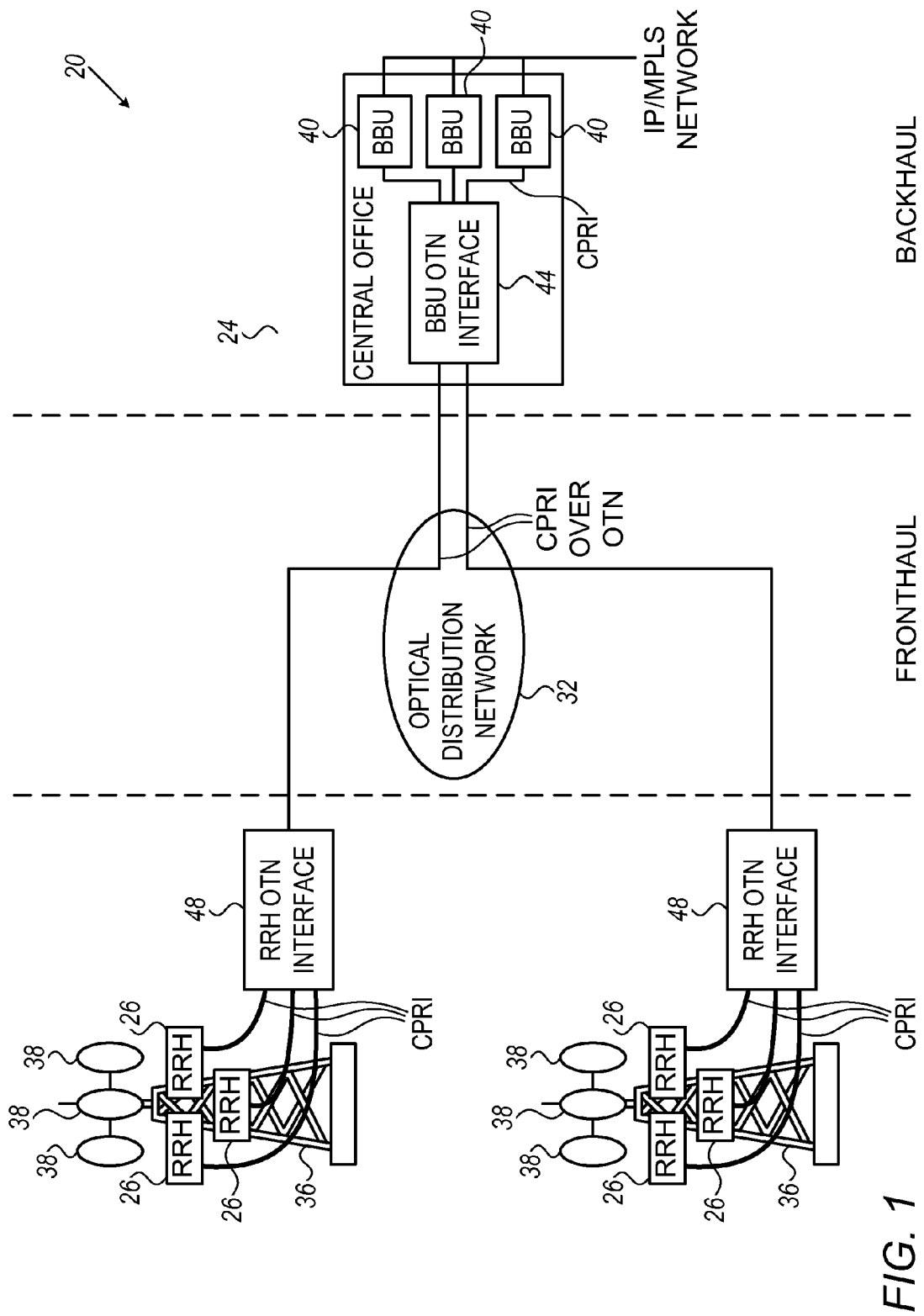
FIG. 1 is a block diagram that schematically illustrates a communication network that delivers Common Public Radio Interface (CPRI) signals, in accordance with an embodiment that is described herein.

Various communication networks comprise multiple base station sites that are connected to a central office. In large scale deployments, in which the distance between the BTSs and the central office is typically on the order of 10-30 Km, connecting each antenna having a dedicated base station controller separately to the central office becomes cost prohibitive. One approach to reduce the cost is to install a Remote Radio Head (RRH) per antenna, and to implement the control functionality of the base stations, for multiple antennas, within (or close to) the central office.

A RRH unit is typically designed to convert between the Radio Frequency (RF) signals at the antenna and a sampled and digitized form of the RF signals. A Base Band Unit (BBU) (or a pool of BBUs) at the central office implements the base station controller functionality for the RRHs of one or more BTS sites. In the RRH, the RF signals can be sampled and digitized into CPRI signals, for example, in accordance with the CPRI specifications cited above.

The CPRI signals may be transmitted between the BBU and the RRHs over any suitable network, such as an optical network. The optical network may comprise, for example, an OTN network, as described, for example, in the ITU-T Recommendation G.709/Y.1331 cited above. A CPRI signal associated with a given BBU-to-RRH (or RRH-to-BBU) connection is also referred to herein as a CPRI client signal, a CPRI channel or a CPRI source. Conventionally, the RRHs use the clock of the received signal as their transmit clock (loopback timing), and the BBUs connected to the RRHs of the different sectors use the same clock source.

Embodiments of the present invention that are described herein provide improved methods and systems for efficient delivery of CPRI signals over an optical network. In some embodiments, a BBU interface at the central office and a RRH interface at the BTS site interface the CPRI signals for delivery over the optical network.

In some embodiments, the BBU interface receives from the BBU CPRI signals comprising data symbols that were derived by encoding respective characters. In accordance with the CPRI specifications cited above, the characters comprise data bytes (i.e., 8-bit characters), the data symbols comprise 10-bit symbols, and the encoding scheme comprises an 8-bit to 10-bit (8b/10b) line coding scheme. The CPRI specifications define different options for the line bit rate, as integer multiples of the option-1 line rate—614.4 Mbit/sec.

The CPRI specifications further define a frame hierarchy in which the data symbols of a CPRI signal (or the respective characters) are organized in basic frames, hyper frames and CPRI frames. Thus, a CPRI frame comprises 150 hyper frames, and a hyper frame comprises 256 basic frames. The $64^{th}$ basic frame in a hyper frame carries a Hyper Frame Number (HFN), which is a sequential cyclic counter in the range 0 . . . 255. Note that the disclosed techniques are not limited to the CPRI signal and frame hierarchy definitions described above, and any other suitable signal structure and frame hierarchy can also be used.

The encoding of 8-bit characters to 10-bit data symbols does not use all possible 10-bit symbols, and therefore leaves room for symbols that have no corresponding characters. Such symbols may be used for control and synchronization. For example, the first symbol in each CPRI hyper frame comprises a synchronization symbol, which according to the CPRI specifications serves for frame synchronization.

In some embodiments, the BBU interface recovers the characters from the data symbols, discards the synchronization symbol and maps the characters into communication frames of the OTN. Mapping the raw 8-bit characters instead of the 10-bit symbols provide a considerable reduction in overhead. In an embodiment, the BBU interface inserts, in place of the discarded synchronization symbol an alarm indication character that indicates error events relating to the CPRI signal.

The RRH interface receives the OTN communication frames, and synchronizes to the CPRI basic frames and hyper frames independently of the synchronization symbol. Several efficient synchronization methods are described in detail below. The RRH interface typically reconstructs the CPRI signal, including both the data symbols and the discarded synchronization symbols, by re-encoding the extracted characters, and sends the reconstructed CPRI signal to the RRH. The BBU and RRH communicate CPRI signals conventionally and are unaware of the efficient delivery of the CPRI signals over the optical network.

In some embodiments, multiple CPRI signals are synchronized to the same clock source and may therefore be mapped into an OTN multi-frame. In an example embodiment, the OTN multi-frame comprises nine OTN frames—e.g., ODUK or OTUK structures. The characters of the multiple CPRI signals are mapped into the payload areas of the OTN frames by interleaving the multiple CPRI signals e.g., on a character-per-CPRI-signal basis, using a Bit-synchronous Mapping Procedure (BMP) that does not add any stuffing characters.

In addition, a pointer or offset to the first full basic frame of each CPRI signal is set in the overhead area of the OTN frames. When receiving OTN communication frames from the network, the BBU and RRH interfaces use these pointers for synchronizing to the basic frames within the OTN frames, independently of the synchronization symbol.

In alternative embodiments, the basic frames are mapped into the payload areas aligned to the boundaries of the OTN frames. In such embodiments, no pointers to the basic frames are needed. To achieve such an alignment, however, these embodiments may introduce a delay of up to one basic frame.

The actual BMP mapping used depends on the CPRI rate option of the CPRI signals. Some of the disclosed embodiments support the following communication configurations of CPRI signals over an OTN point-to-point connection:

Twenty four CPRI option-1 signals.
Twelve CPRI option-2 signals.
Six CPRI option-3 signals.
Three CPRI option-5 signals.

By mapping 8-bit characters into the OTN frames rather than the original 10-bit data symbols of the CPRI signals, and by using BMP mapping (i.e., without stuffing) the disclosed techniques achieve a reduction of 20% or more in the communication data rate over the optical network. Using the disclosed techniques the CPRI signals can be delivered over the optical network at a rate of about 11.84 Gbit/sec without error correction coding, and at about 12.64 Gbit/sec with error correction coding. Alternatively, the disclosed techniques are also applicable to mapping CPRI signals of any other suitable rate option into any other suitable OTN structures of any suitable OTN transmission rate.

In some embodiments, to synchronize to the CPRI hyper frames, the (BBU or RRH) interface first identifies the basic frames that carry the HFN and then infers the boundaries of the hyper frames from the position of these basic frames within the hyper frames. In an embodiment, to identify the basic frames carrying the HFN, the BBU or RRH interface divides the basic frames into multiple interleaved subsequences each having an intra-frame spacing of a hyper-frame interval, and identifies a sub-sequence in which a field that is expected to contain the HFN increments monotonically and cyclically in the range 0 . . . 149 over two or more of the basic frames. The interface considers this sequence to be synchronized to the hyper frame at the $64^{th}$ basic frame.

In principle, each of the BBU and RRH interfaces could generate a local clock signal (i.e., independently from the clock of the CPRI signals) for transmitting the OTN frames to the network, and recover, from the payload of the received OTN frames, a clock signal for transmitting CPRI signals towards the BBU and RRH. Such schemes, however, would result in large momentary deviations of frequency and/or phase from their true values (also referred as wander) in the recovered clock signal, which may result in errors or otherwise degraded performance.

In some of the disclosed embodiments, the BBU interface recovers the CPRI clock from the CPRI basic frames sent by the BBU, and uses this recovered clock for transmitting CPRI signals from the BBU interface to the BBU in the opposite direction (loop back timing). The BBU interface up converts the recovered CPRI clock by a predefined ratio for transmitting the OTN frames to the network.

The RRH interface recovers the OTN clock from the received OTN frames and uses the recovered OTN clock for sending OTN frames to the network towards the BBU (i.e., loop back timing). The RRH interface down converts the recovered OTN clock for sending CPRI signals to the RRH. In an embodiment, the up conversion ratio in the BBU interface and the down conversion ratio in RRH interface comprise reciprocals of one another. The disclosed loop back timing techniques reduce the extent of frequency and phase wander significantly relative to using locally generated OTN clock signals.

System Description

FIG. 1 is a block diagram that schematically illustrates a communication network 20 that delivers Common Public Radio Interface (CPRI) signals, in accordance with an embodiment that is described herein. Network 20 comprises a central office 24, which connects to an IP over Multi-Protocol Label Switching (IP/MPLS) network. Central office 24 communicates CPRI signals that carry the IP/MPLS data with multiple Remote Radio Head (RRH) units 26 over a network 32. The distance between the central office and the RRHs is typically on the order of 10 Km-30 Km, but smaller or larger distances are also possible.

Communication system 20 may comprise any suitable communication network, using any suitable technology, such as, for example, GSM, Code Division Multiple Access (CDMA), Universal Mobile Telecommunications System (UMTS), Long Term Evolution (LTE), or LTE Advanced (LTE-A). The part of network 20 comprising the IP/MPLS network and the central office is also referred to as a backhaul network. The part of network 20 comprising network 32 is also referred to as a front-haul network. In some embodiments, network 32 comprises an optical distribution network, such as, for example, an Optical Transport Network (OTN). OTN is described, for example in ITU-T Recommendation G.709/Y.1331 cited above.

System 20 comprises multiple Base Transceiver Station (BTS) towers 36, on top of which one or more Radio Frequency (RF) antennas 38 are mounted. Typically, RRH units 26 are mounted close to respective antennas 38. In the example system of FIG. 1, each BTS tower 36 comprises three directional antennas 38, thus implementing a three-cell BTS. In alternative embodiments, each BTS comprises up to six sectors. Further alternatively, any other suitable number of sectors per BTS can also be used.

RRH 26, which is also referred to as a Radio Equipment (RE) unit, typically comprises RF circuitry connected to antenna 38, as well as up/down converters and analog-to-digital/digital-to-analog converters (not shown) for converting between the RF signals at the antenna and a sampled and digitized version of the RF signals.

Central office 24 comprises a pool of Base Band Units (BBU) 40 and a BBU OTN interface 44. Each BBU 40 and a respective RRH with which it communicates can be viewed as a distributed implementation of a Base Station (BS) in network 20. Among other tasks, BBU 40 converts data received from the IP/MPLS network to CPRI signals to be sent to the RRHs via network 32, and converts CPRI signals received from the RRHs via network 32 to a data format suitable for delivery to the IP/MPLS network.

In the BBU to RRH direction, BBU OTN interface 44 maps CPRI signals received from each BBU 40 into communication frames suitable for sending over network 32. In the opposite RRH to BBU direction, BBU OTN interface 44 de-maps communication frames received via network 32 to recover the CPRI signals, and delivers the CPRI signals to a relevant BBU 40.

System 20 additionally comprises multiple RRH OTN interface units 48 that interface between network 32 and RRHs 26 at the BTS sites. In the BBU to RRH direction, RRH OTN interface 48 extracts the CPRI signals from the communication frames received from network 32, and sends the CPRI signals to a respective RRH 26. In the RRH to BBU direction, RRH OTN interface 48 receives CPRI signals from a given RRH 26, maps the CPRI signals into communication frames of network 32 and sends the communication frames via network 32 to respective BBU 40.

The configuration of communication system 20 in FIG. 1 is given by way of example, and in alternative embodiments any other suitable system configuration can also be used. For example, although in FIG. 1 each BTS comprises three RRH units, in alternative embodiments a BTS may comprise any other suitable number of RRHs, and different BTSs may comprise a different number of RRHs.

Figure 2:
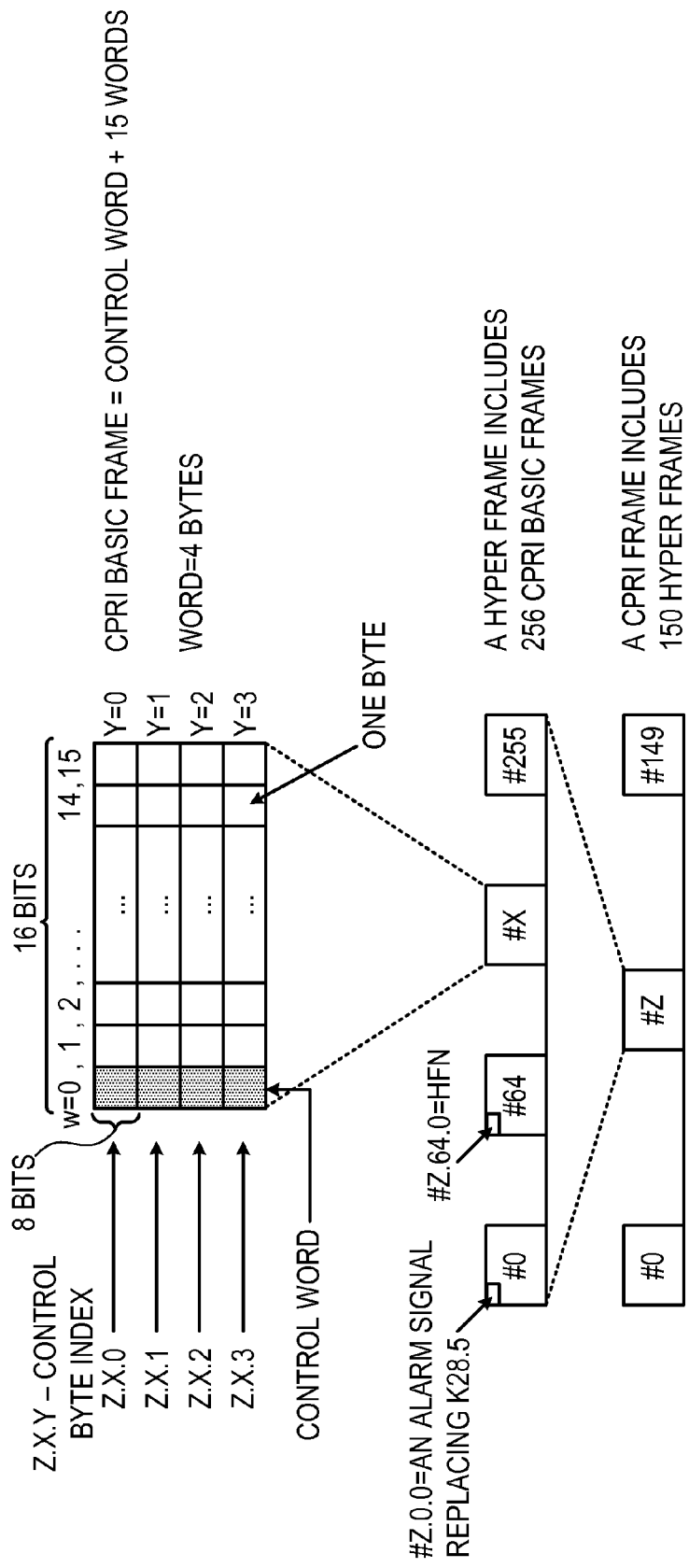
FIG. 2 is a diagram that schematically depicts CPRI frame hierarchy, in accordance with an embodiment that is described herein.

FIG. 2 is a diagram that schematically depicts CPRI frame hierarchy, in accordance with an embodiment that is described herein. As seen in FIG. 2, CPRI signals are delivered in a hierarchical framing structure. In accordance with the CPRI specifications cited above, a CPRI frame comprises 150 hyper frames that are indexed by the letter Z, a hyper frame comprises 256 basic frames that are indexed by the letter X, and a basic frame comprises sixteen words that are indexed by the letter W. Each word comprises one or more bytes (depending on the CPRI rate option) that are indexed by the letter Y. The word indexed by W=0 comprises a control word.

As noted above, the number of bytes per word depends on the CPRI rate option. The example of FIG. 2, refers to a CPRI option-3 rate, for which each word in the basic frame comprises four bytes, i.e., Y=0 . . . 3. Table 1 below summarizes several word sizes corresponding to various CPRI rate options. In accordance with the CPRI specifications, the frame-rate of the basic frames is 3.84 Mhz. Alternatively, any other suitable frame-rate can also be used.

TABLE 1

CPRI word size for selected rate options

| CPRI rate option | Line bit rate [Mbit/sec] | # bytes per word in a basic frame | # total bytes per basic frame |
|---|---|---|---|
| Option-1 | 614.4 | 1 | 16 |
| Option-2 | 1228.8 | 2 | 32 |
| Option-3 | 2457.6 | 4 | 64 |
| Option-5 | 4915.2 | 8 | 128 |

The bytes of the control word, which are also referred to herein as control bytes, are assigned indices Z.X.Y, wherein Z and X refer to the CPRI frame index and the hyper frame index, respectively, and Y refers to a respective byte within the control word. In the example of FIG. 2, the words comprise four bytes, and the control byte indices are denoted Z.X.0, Z.X.1, Z.X.2 and Z.X.3.

The CPRI specifications cited above, define an invertible line coding mapping scheme between 8-bit characters (i.e., bytes) of the basic frame and 10-bit CPRI data symbols to be sent over the network. The 8-bit to 10-bit mapping is also referred to as an 8b/10b encoding scheme, or a line coding scheme. The CPRI data symbols utilize only 512 of the possible 1024 10-bit values. One or more of the remaining 512 10-bit values are used for synchronization and control.

For example, in accordance with the CPRI specifications cited above, byte Z.X.0 of the first basic frame in a hyper frame (i.e., Z.0.0) comprises a synchronization symbol denoted K28.5, which marks the hyper frame start. In addition, the control byte Z.64.0 (i.e., in the control word of the basic frame whose index in the hyper frame is 64) holds the Hyper Frame Number (HFN) i.e., the value Z. Note that $0 \leq Z \leq 149$, and therefore can be represented by a single byte.

In the disclosed techniques, the CPRI signals are sent over network 32 after stripping the line coding with which the CPRI signals are received. Sending 8-bit instead of 10-bit symbols achieves a 20% reduction in the data rate over the network. The 8-bit characters are recovered from the 10-bit symbols and mapped into communication frames to be sent over network 32. Moreover, since only 8-bit characters are sent over the network, the synchronization symbol K28.5 is discarded and alternative novel synchronization mechanisms are employed, as will be described below. In some embodiments, instead of sending the synchronization symbol K28.5 for the control byte Z.0.0, the control byte Z.0.0 uses for delivering an alarm signal as will be described below.

The CPRI frame hierarchy configuration in FIG. 2 is given by way of example. In alternative embodiments any other suitable frame hierarchy can also be used. For example, using the K28.5 symbol as a synchronization symbol at byte Z.0.0 and using byte Z.64.0 for holding the HFN is not mandatory, and any other suitable settings are also possible.

Figure 3:
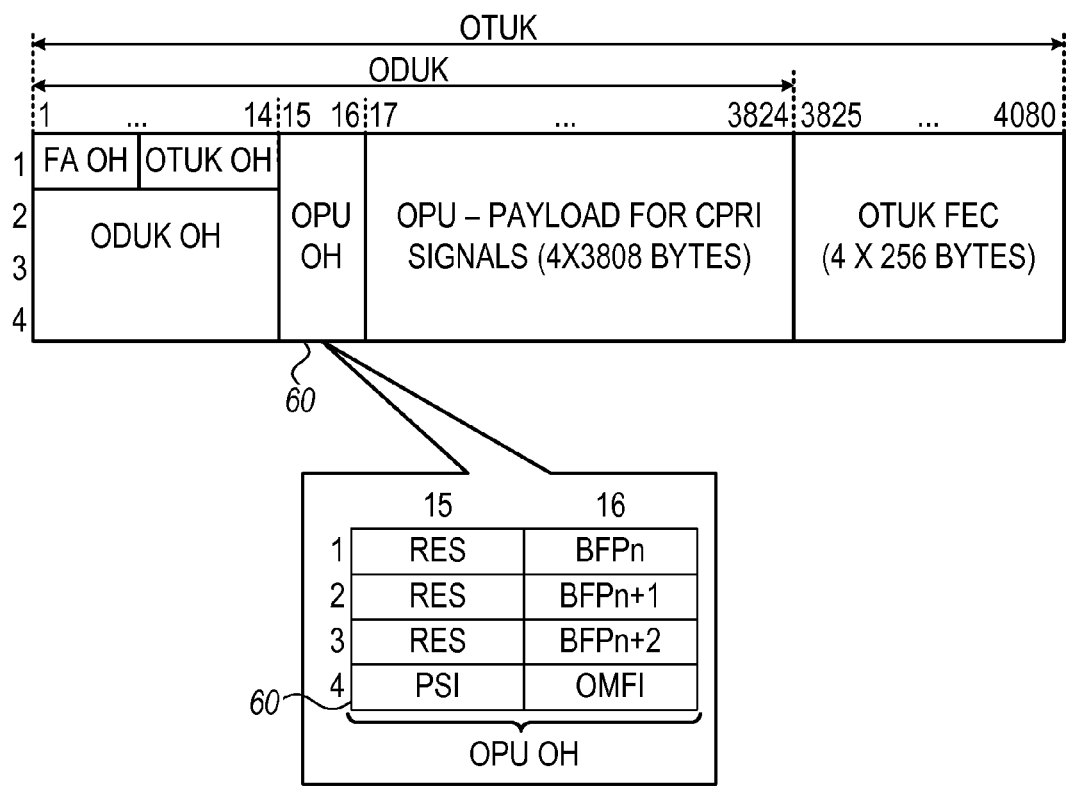
FIG. 3 is a diagram that schematically depicts OTN frame hierarchy and its usage in delivering CPRI signals, in accordance with an embodiment that is described herein.

FIG. 3 is a diagram that schematically depicts OTN frame hierarchy and its usage in delivering CPRI signals, in accordance with an embodiment that is described herein. The structure and hierarchy of OTN frames is defined, for example, in the ITU-T Recommendation G.709/Y.1331 cited above. FIG. 3 depicts three basic OTN information structures (or frames) that respectively define the optical channel-payload unit (OPUK), data unit (ODUK), and transport unit (OTUK). The index K=0 . . . 4 refers to corresponding signal rates as defined in tables 7-1 to 7-4 of the ITU-T Recommendation G.709/Y.1331 cited above. In the context of the present patent application the OPUK, ODUK and OTUK structures are collectively referred to as OTN structures or OTN frames.

The OTUK frame is organized as a rectangle structure having four lines and 4080 columns. The first 3824 columns of the OTUK frame comprise an ODUK frame, and the remaining 3825-4080 columns comprise a Forward Error correction Code (FEC) of the OTUK frame, e.g., a Reed-Solomon (RS) FEC code.

Columns 1-14 of the ODUK frame comprise an ODUK Overhead (OH) area, an OTUK OH area and a Frame Alignment (FA) OH area. The overhead areas of the OTUK and ODUK frames typically carry information regarding alarm indications, error monitoring, maintenance signals and protection switch control channels.

Columns 17-3824 of the OTUK frame comprise the OPU payload area, which carries CPRI signals, and columns 15-16 comprise a respective OPU overhead area 60. The three RES bytes in column 15 of OPU OH 60 are reserved.

The Payload Structure Identifier (PSI) byte typically transports a 256-byte PSI signal over multiple ODUK frames. The Multi-Frame Identifier (OMFI) byte in column 16 is typically used as a frame counter in a multi-frame OTN structure. For example, in some of the embodiments that are disclosed below the OMFI byte serves as a frame counter in an OTN multi-frame structure that comprises multiple of three OTN frames in a multi-frame, such as, for example, nine or three OTN frames per a multi-frame, as will be described below.

In some embodiments, the first three bytes in column 16 (within OPU OH 60) are denoted BFPn, BFPn+1, BFPn+2 and are used as pointers to CPRI basic frames within the OPU area. In some embodiments, the BFPn value represent the number of bytes mapped into the OPU2 payload for a CPRI channel (n), in the frame (in the OTN multi-frame) for which OMFI=0x00, before a full CPRI basic frame of this channel starts. In an embodiment, a different number of CPRI signals (or channels) are carried in the OPU area, depending on the CPRI rate option as summarized in Table 2. In some embodiments, unused BFPn bytes are set to 0x00, or to any other suitable value. For example, unused BFPn may duplicate used BFPn values to reduce detection time at the receiving side.

TABLE 2

The number of CPRI channels carried in an OTN signal of depending on the CPRI rate option.

| CPRI rate option | # CPRI channels carries in an OTN signal | BFPn used |
|---|---|---|
| 1 | 24 | BFP1 . . . BFP24 |
| 2 | 12 | BFP1 . . . BFP12 |
| 3 | 6 | BFP1 . . . BFP6 |
| 5 | 3 | BFP1 . . . BFP3 |

As described above, in some embodiments the CPRI channels are mapped to OPU payload areas in a multi-frame structure of nine OTN frames. Table 3 summarizes the assignment of BFPn values for each OMFI value in the range 0 . . . 8. In addition, Table 3 depicts which of the BFPn values are needed, depending on the CPRI rate option. Bytes that are not assigned to any BFPn value serve as reserved bytes.

TABLE 3

BFPn allocation to OMFI values

| OMFI (Hex) | BFPn | BFPn + 1 | BFPn + 2 | CPRI rate options 1 | 2 | 3 | 5 |
|---|---|---|---|---|---|---|---|
| 0x00 | BFP1 | BFP2 | BFP3 | ✓ | ✓ | ✓ | ✓ |
| 0x01 | BFP4 | BFP5 | BFP6 | ✓ | ✓ | ✓ | |
| 0x02 | BFP7 | BFP8 | BFP9 | ✓ | ✓ | | |
| 0x03 | BFP10 | BFP11 | BFP12 | ✓ | ✓ | | |
| 0x04 | BFP13 | BFP14 | BFP15 | ✓ | | | |
| 0x05 | BFP16 | BFP17 | BFP18 | ✓ | | | |
| 0x06 | BFP19 | BFP20 | BFP21 | ✓ | | | |
| 0x07 | BFP22 | BFP23 | BFP24 | ✓ | | | |
| 0x08 | Reserved | Reserved | Reserved | | | Reserved | |

FIGS. 4-7 are diagrams depicting tables for mapping CPRI channels into an OTN multi-frame for various CPRI rate options, in accordance with embodiments that are described herein. Each of the tables comprises nine OPU areas that correspond to respective OTUK frames of the nine-frame OTN multi-frame. Table 4 depicts the number of CPRI channels mapped as a function of the CPRI rate option used.

TABLE 4

CPRI channels mapped depending on the CPRI rate option used.

| CPRI rate option | N—number of CPRI channels mapped |
|---|---|
| 1 | 24 |
| 2 | 12 |
| 3 | 6 |
| 5 | 3 |

In the tables of FIGS. 4-7, columns 15 and 16 refer to OPU OH area 60, and columns 17 . . . 3824 refer to the OPU payload area, as described, for example, in FIG. 3 above. The OFMI values in column 16 increment from 0x00 for the first payload to 0x08 for the last payload in the OTN multi-frame. The BFPn values in column 16 are assigned in accordance with Table 3 above. In an example embodiment, the CPRI channels are mapped in a byte-interleaved manner. The mapping of the CPRI channels starts at column 17 and line 1 of the payload corresponding to OMFI 0x00. The CPRI channels are mapped sequentially—one byte from each of the respective channels CH1 . . . CHN. The sequential mapping of bytes from respective channels repeats until filling the entire OTN multi-frame. Alternatively, any other interleaving scheme, possibly mapping more than one byte per channel in sequence, can also be used.

The table of FIG. 4, describes a scheme for mapping twenty four CPRI channels into an OTN multi-frame. The channel bytes are mapped in a repeated sequential order CH1 . . . CH24. As seen in Table 3 above, in this case all the BFP1 . . . BFP24 values are used. The table of FIG. 5 maps twelve CPRI channels into the OTN multi-frame in a repeated sequence CH1 . . . CH12, using only BFP1 . . . BFP12.

Similarly, the table of FIG. 6, maps six CPRI channels into the OTN multi-frame using a repeated sequence CH1 . . . CH6 (and BFP1 . . . BFP6), and the table of FIG. 7, maps three CPRI channels into the OTN multi-frame using a repeated sequence CH1 . . . CH3 (and BFP1 . . . BFP3).

The mapping tables in FIGS. 4-7 above are given by way of example, and in alternative embodiments any other suitable mapping tables can also be used. For example, although in the tables of FIGS. 4-7 the channels are interleaved sequentially, in other embodiments, any other suitable interleaving scheme can also be used.

FIG. 8 is a diagram depicting the usage of pointers to CPRI basic frames for synchronization, in accordance with an embodiment that is described herein. The mapping table of FIG. 8 is the same as in FIG. 6 above, and refers to mapping N=6 CPRI option-3 channels into a nine-frame OTN multi-frame. Assume, for example, that three bytes that were mapped into the OPUK corresponding to OMFI=0x00 are the last three bytes of a CPRI basic frame from channel n=5. The offset (in bytes) to the next full CPRI basic frame of channel n=5 is related to BFPn=BFP5=3. Since the table maps N=6 channels in sequence, the offset within the OPUK structure is BFP5·N=3·6=18 bytes and the offset relative to the first byte of the ODUK (or OTUK) structure is given by 17+3·6+(5−1)=39 bytes. To conclude, BFP5 should be set to BFP5=3 in the payload corresponding to OMFI=0x01 so as to point to the first full CPRI basic frame of channel n=5, as indicated by the arrow in FIG. 8.

The method for pointing to basic frames using the BFPn values described in FIG. 8 is given by way of example, and in alternative embodiments any other suitable pointing method can also be used. For example, although the BFPn values use for pointing to a basic frame in the OTN structure for which OMFI=0x00, in alternative embodiments a BFPn may point to a basic frame other than the first, possibly in an OTN frame for which OMFI>0x00.

Data Flow and Clock Timing

Figure 9:
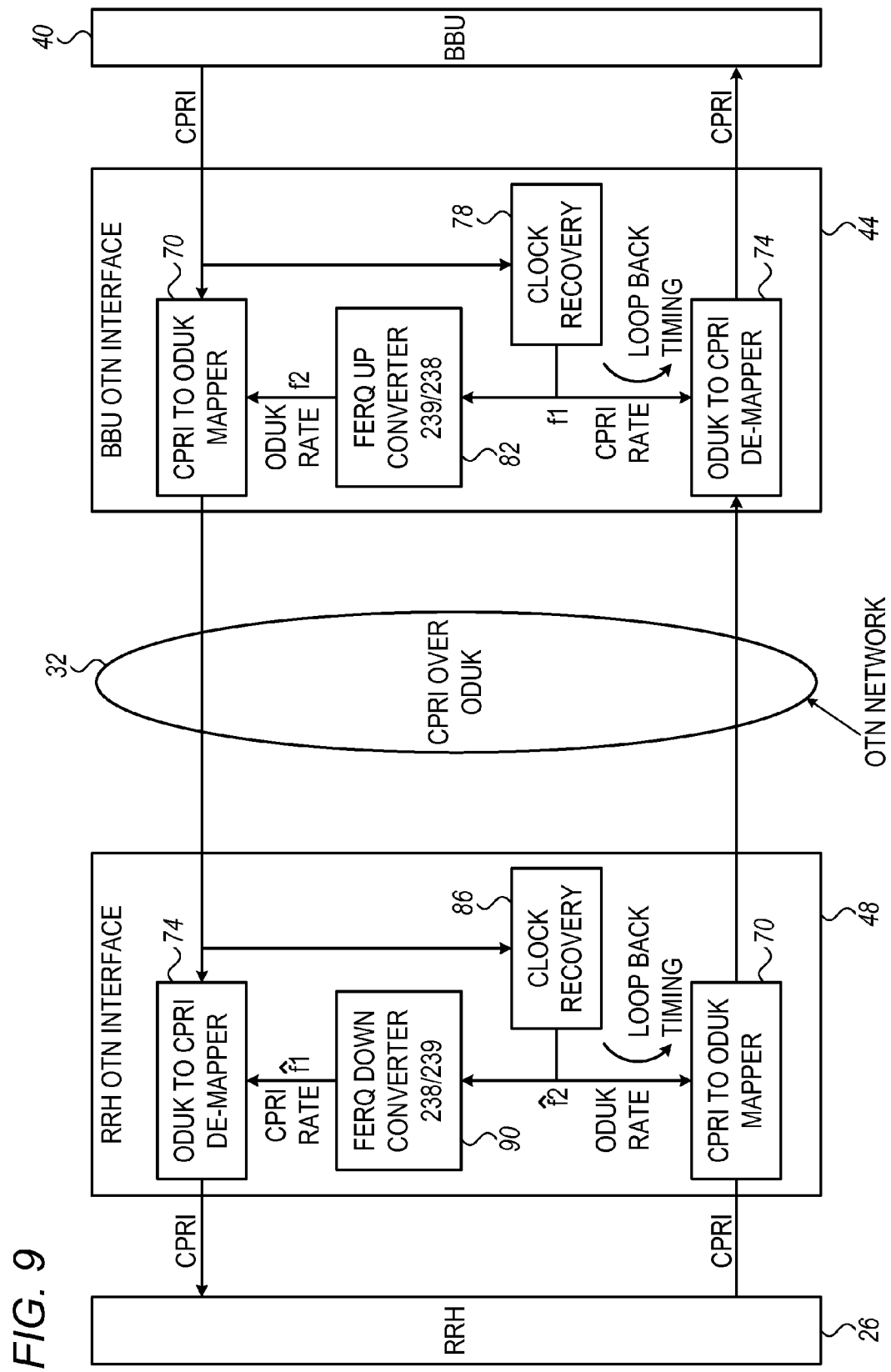
FIG. 9 is a block diagram that schematically illustrates a data flow in communicating CPRI signals over an optical network, in accordance with an embodiment that is described herein.

FIG. 9 is a block diagram that schematically illustrates a data flow in communicating CPRI signals over an optical network, in accordance with an embodiment that is described herein. BBU 40 in FIG. 9 communicates CPRI signals with RRH 26 over optical network 32. BBU 40 may reside in central office 24, and RRH 26 may be mounted on a BTS tower, as described, for example, in system 20 of FIG. 1 above.

BBU 40 and RRH 26 communicate CPRI signals over network 32 using a BBU OTN interface 44 and a RRH OTN interface 48, respectively. In the present example network 32 comprises an OTN network, and the CPRI signals are delivered over the network by mapping the CPRI signals into ODUK structures. Alternatively, the CPRI signals may by mapped into OTUK structures i.e., including FEC, or to any other suitable structure of the OTN. For the sake of brevity, BBU OTN interface 44 and RRH OTN 48 interface are also referred to simply as a BBU interface and a RRH interfaces, respectively.

In the description that follows we assume that the BBU produces the CPRI signals in accordance with the CPRI specifications cited above. In particular, we assume that the CPRI signals carry 10-bit CPRI symbols that were encoded from 8-bit characters (bytes) using a suitable 8b/10b line coding scheme. Additionally, the CPRI signals are delivered using a frame hierarchy that includes CPRI basic and hyper frames as depicted, for example, in FIG. 2 above.

In the BBU to RRH direction, a CPRI to ODUK mapper 70 (or simply mapper, for brevity) receives a CPRI signal from a respective BBU 40. Mapper 70 recovers the bytes of the CPRI signal from the 10-bit symbols and replaces the K28.5 synchronization symbol with an alarm character as will be described below. Mapper 70 then maps the CPRI bytes into the ODUK structures using, for example, one of the mapping tables described in FIGS. 4-7 above. Mapper 70 sends the ODUK frames to network 32.

An ODUK to CPRI de-mapper 74 in RRH interface 48 receives the ODUK frames from network 32 and synchronizes to the CPRI basic and hyper frames (as will be described in detail below). De-mapper 74 extracts the CPRI bytes of the different CPRI signals using, for example, one of the mapping tables of FIGS. 4-7 above, re-encodes the CPRI bytes to 10-bit symbols using the 8b/10b encoding scheme, regenerates the K28.5 synchronization symbol instead of byte Z.0.0 and sends the CPRI signals to RRH 26. A similar flow and processing applies to the RRH to BBU direction. Example hardware implementations of mapper 70 and de-mapper 74 are descried further below.

In principle, BBU interface 44 and RRH interface 48 could each generate a local clock signal (i.e., independently from the clock of the CPRI signals) for transmitting the ODUK frames to the network. In such solutions, the clock signal for transmitting CPRI signals towards the BBU and RRH would be recovered from the ODUk payload, which may comprise stuffing bytes in addition to the CPRI signals. Such schemes, however, would typically result in large momentary frequency and/or phase deviations from their true values (also referred as wander) in the recovered clock signal, for example, when the clock recovery unit attempts to correct the frequency using a step function upon detecting a stuffing byte. Large wander levels may become unacceptable and result in degraded performance.

In embodiments that are disclosed below, the BBU transmits ODUK frames to the network using a clock signal that is synchronized to the clock of the CPRI signal. In addition, in the RRH to BBU direction, the clock signal that RRH interface 48 uses for transmitting ODUK frames to the network, and the clock signal that BBU interface uses for transmitting CPRI signals to BBU 40 are produced using loop back timing techniques. The disclosed timing schemes thus introduce wander levels that are significantly smaller than the wander levels that are typically introduced in conventional timing schemes.

BBU interface 44 comprises a clock recovery unit 78 that receives CPRI signals from BBU 40 and recovers a respective CPRI clock signal (of frequency denoted f1). Using a loop back timing technique, de-mapper 74 in BBU interface 44 uses the clock signal recovered by unit 78 for transmitting CPRI signals (originated in the RRH) to BBU 40. A frequency up converter 82 generates a clock signal whose frequency equals f1 multiplied by a 239/238 factor that compensates for the difference in size between the ODUK and OPUK structures. Mapper 70 uses the up converted clock signal for transmitting ODUK frames to network 32.

In RRH interface 48, a clock recovery unit 86 recovers an ODUK clock signal from the ODUK frames (of frequency denoted $\widetilde{f2}$ ). A frequency down converter unit 90 down converts the output of clock recovery 86 by a ratio 238/239. Since up converter 82 and down converter 90 use reciprocal conversion ratios, the frequency of the clock signal output by down converter 90 is very close to the clock frequency of the CPRI signals originated in the BBU. De-mapper 74 in RRH interface 48 uses the clock signal output by frequency down converter 90 to transmit CPRI signals (originated in the BBU) to RRH 26. The clock signal output by clock recovery 86 uses for transmitting ODUK frames from mapper 70 of RRH interface 48 to network 32 (a loop back timing technique.)

The data flow and timing schemes described in FIG. 9 are given by way of example, and in alternative embodiments any other suitable data flow and timing schemes can also be used. For example, in similar embodiments that use OTUK structures rather than ODUK structures, the conversion ratios in up and down converters 82 and 90 are given by 255/238 and 238/255, respectively. Alternatively, any other suitable OTN structures and corresponding frequency conversion ratios can also be used.

Implementing CPRI-OTN Mapper and De-Mapper in Hardware

Figure 10:
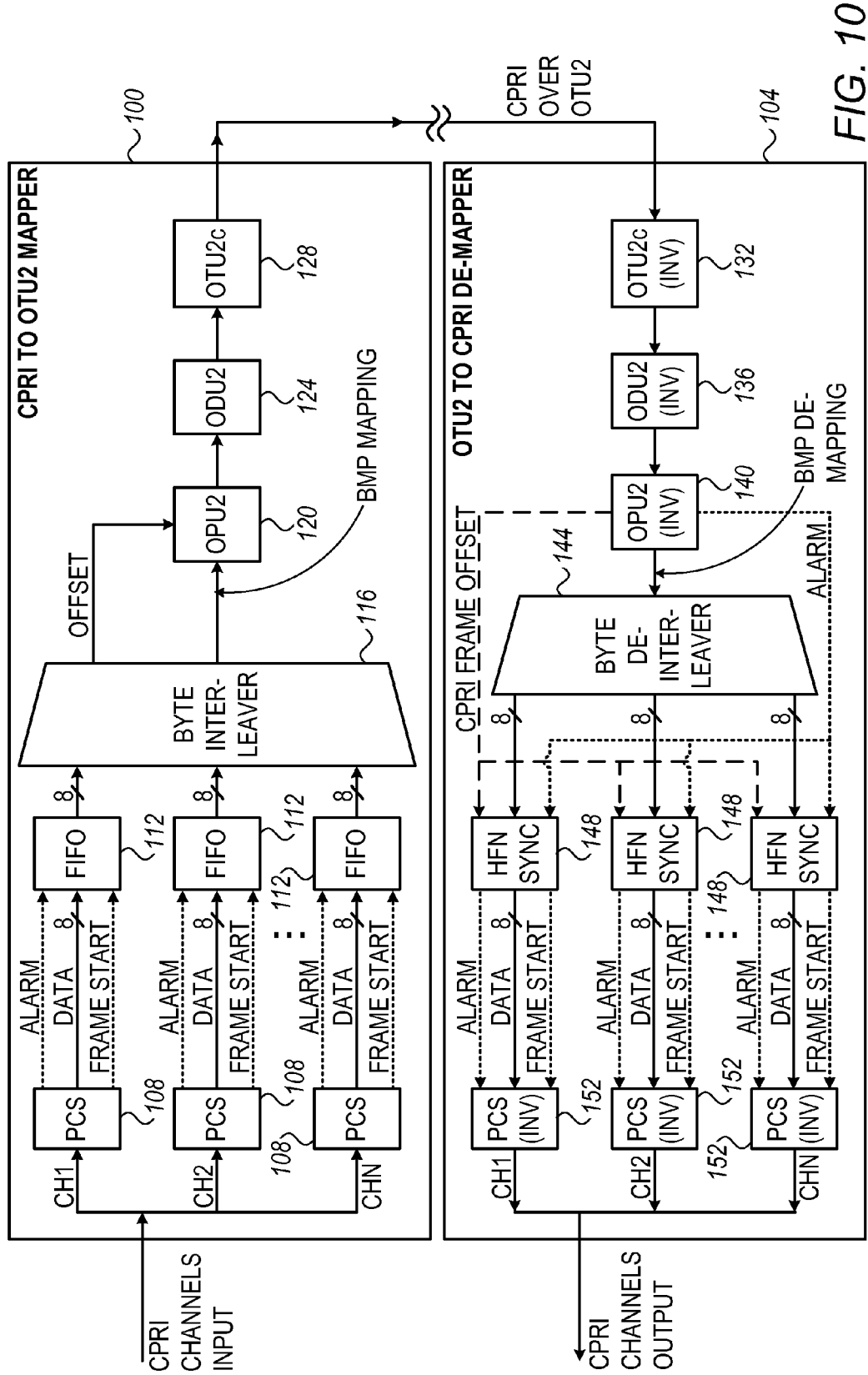
FIG. 10 is a block diagram that schematically illustrates hardware implementations of a CPRI to OTU2 mapper and an OTU2 to CPRI de-mapper, in accordance with an embodiment that is described herein.

FIG. 10 is a block diagram that schematically illustrates hardware implementations of a CPRI to OTU2 mapper 100 and an OTU2 to CPRI de-mapper 104, in accordance with an embodiment that is described herein. CPRI to OTU2 mapper 100 and OTU2 to CPRI de-mapper 104 are also simply referred to as mapper 100 and de-mapper 104, for brevity. Mapper 100 and de-mapper 104 can be respectively used, for example, for implementing CPRI to ODUK mapper 70 and ODUK to CPRI de-mapper 74 of FIG. 9 above.

Mapper 100 receives N CPRI signals denoted CH1 ... CNH, wherein N depends on the CPRI rate option used as depicted, for example, in Table 4 above. Mapper 100 comprises N Physical Coding Sub-layer (PCS) units 108 for terminating the respective CPRI signals. PCS 108 recovers the CPRI data bytes from the 10-bit CPRI data symbols in accordance with the 8b/10b line coding scheme, and stores the recovered CPRI bytes in a respective FIFO 112.

FIFO 112 typically comprises a few bytes of storage, such as, for example a two-byte FIFO. Alternatively, FIFO 112 may comprise any other suitable storage capacity. Further alternatively, storage elements other than a FIFO and of any suitable storage capacity can also be used.

PCS 108 identifies the start of CPRI hyper frames by detecting the synchronization symbol K28.5 among the CPRI symbols. PCS 108 discards the K28.5 synchronization symbol, and sets the respective byte Z.0.0 to 0x00 or 0x01 depending on whether the PCS detects (or not) an error in the CPRI signal.

A byte interleaver 116 receives the CPRI data bytes from FIFOs 112, and interleaves the CPRI channels by orderly outputting one byte from each CPRI channel, and repeating this order as necessary. Interleaver 116 thus outputs a byte sequence of the form {CH1, CH2, ..., CHN, CH1, CH2, ...} towards OPU2 unit 120. Alternatively, any other suitable interlaeaving scheme can also be used.

OPU2 unit 120 maps the interleaved CPRI bytes in one or more OPU2 structures (of on OTN multi-frame) using a Bit-synchronous Mapping Procedure (BMP). In some embodiments, OPU2 unit 120 maps the CPRI signal in accordance with one of the mapping tables of FIG. 4-7 above. Byte interleaver 116 indicates to OPU2 unit 120 an offset value, offset(n), corresponding to the first CPRI basic frame for the $n^{th}$ CPRI signal, and OPU2 unit 120 uses the offset(n) value to set the respective BFPn pointer. In an example embodiment, OPU2 unit 120 sets the BFPn value to the number of bytes mapped to the OPUk payload before the beginning of a CPRI basic frame. Alternatively OPU2 unit 120 may calculate the BFPn value using any other suitable method.

An ODU2 unit 124 and an OTU2c unit generate communication frames suitable for delivery over the optical network in accordance with ITU-T Recommendation G.709/Y.1331 cited above. ODU2 unit 124 adds an ODU2 OH to the OPU2 structure to derive an ODU structure, and OTU2c unit 128 adds FEC bits, as well as an OTU2 OH and a FA OH, to produce an OTU2 structure. Mapper 100 transmits the OTU2 frames using a clock signal that is synchronized to the clock of the CPRI signals received, as described, for example, in FIG. 9 above.

De-mapper 104 receives ODU2 frames in which CPRI signals are mapped in accordance with the mapping schemes of mapper 100 as described above, and performs inverse processing with respect to mapper 100. OTU2c (inverse) unit 132 performs error correction using the FEC bits in the OTU2 structure, and delivers the result ODU2 structure to an ODU2 (inverse) unit 136, which extracts the OPU2 payload. An OPU2 (inverse) unit 140 performs BMP de-mapping to extract the CPRI data bytes from the payload area of the OPU2 structure. In an embodiment, OPU2 (inverse) unit 140 de-maps the CPRI data bytes in the OPU2 payload using one of the mapping tables of FIGS. 4-7 above. Unit 140 delivers the CPRI data bytes to a byte de-interleaver 144, which separates between the bytes of the different CPRI channels.

OPU2 (inverse) unit 140 additionally synchronizes to the CPRI basic frames using the BFPn and OMFI values in OPU2 OH 60. In an embodiment, unit 140 derives the byte-offset to the first full CPRI basic frame of the $n^{th}$ CPRI channel ($1 \le n \le N$) in accordance with the formula: offset(n)= 16+n+BFPn·N. In this formula, the constant 16 refers to column 16 in the OTU2 structure, n is the CPRI channel number, and N is the total number of CPRI channels.

Byte de-interleaver 144 delivers the de-interleaved bytes of each the CPRI channels separately to a respective HFN synchronizer 148, which synchronizes on the CPRI hyper frames. In some embodiments, HFN synchronizer 148 uses byte Z.64.0 in the $64^{th}$ basic frame, which holds the Hyper Frame Number (HFN), for hyper frame synchronization.

HFN synchronizer 148 examines byte Z.X.0 in a sub-sequence (or multiple sub-sequences) of CPRI basic frames that are a hyper frame interval apart from one another, to find a sub-sequence of basic frames in which the Z.X.0 values (i.e., for X=64 this value holds the HFN) form a monotonic and cyclical integer count in the range 0 ... 149. HFN synchronizer 148 then identifies the first byte (Z.0.0) of the hyper frame based on the position of the Z.64.0 byte.

In alternative embodiments, HFN synchronizer 148 can use any other suitable synchronization method, such as, for example methods that are based on fields within the CPRI basic frames that hold predefined values.

HFN synchronizer 148 provides the CPRI data bytes to a respective PCS (inverse) unit 152. When the alarm signal carried in the first byte of the hyper frame is zeroed, i.e., Z.0.0=0x00, PCS (inverse) 152 encodes the CPRI data bytes into 10-bit CPRI symbols in accordance with the 8b/10b line coding scheme, and replaces the Z.0.0 bytes with the K28.5 synchronization symbol. When Z.0.0 is nonzero (e.g., equals 0x01), or when the OTN server layer detects an alarm indication, PCS (inverse) 152 discards the CPRI bytes and outputs a fault indication instead.

PCS (inverse) 152 transmits the CPRI signal using a clock signal that is recovered from the OTU2 received frames as described in FIG. 9 above.

In the hardware implementations described above, the OTU2 signal rate is given by 3.84·128·24·255/238≈12.64 Gbit/sec, wherein 3.84 Mhz refers to the frame rate of the CPRI basic frame. In alternative embodiments, the OTN frames are delivered without the FEC bits, i.e., OTU2c unit 128 and OTU2c (inverse) 132 excluded, and the ODU2 rate equals 3.84·128·24·239/238≈11.84 Gbit/sec.

Aligned Mapping of CPRI Signals into OTN Frames

FIGS. 11 and 12 are diagrams that schematically depict tables for aligned mapping of CPRI channels into an OTN multi-frame for two CPRI rate options, in accordance with embodiments that are described herein. In the tables of FIGS. 11 and 12, CPRI signals are mapped into OPUK structures of an OTN multi-frame comprising three OTN frames.

Unlike the mapping tables of FIGS. 4-7 above, in FIGS. 11 and 12 the CPRI basic frames are mapped aligned to the multi-frame boundaries. As a result, the first basic frame starts at offset zero, and the BFPn values remain unused. In the tables of FIGS. 11 and 12, each payload byte is denoted by a two-number symbol k-n in which n denotes the $n^{th}$ CPRI channel and k denotes the byte index in the byte-sequence within the CPRI signal.

For example, since the table of FIG. 11 maps N=6 option-3 CPRI channels, the bytes of channel n=1 are mapped to positions (17, 23, 29, ...), the bytes of channel n=2 are mapped to positions (18, 24, 30, ...,) and so on.

Note that the mapping sequence repeats cyclically after mapping the six CPRI channels into three OPUK structures of 3808 bytes each. Similarly, the table of FIG. 12 maps N=3 option-5 CPRI channels. In this case the bytes of channel n=1 are mapped to positions (17, 20, 23, . . . ), the bytes of CPRI channel n=2 are mapped to positions (18, 21, 24, . . . ,) and the bytes of channel n=3 are mapped to positions (19, 22, 25, . . . ).

Mapping of other CPRI rate options such as rate options-1 (24 CPRI channels) and option-2 (12 CPRI channels) can be done in a manner similar to the mapping described above for rate options-3 and option-5.

The aligned mapping schemes depicted in FIGS. 11 and 12 are given by way of example, and in alternative embodiments, any other suitable aligned mapping scheme can also be used. For example, an interleaving scheme other than mapping the bytes according to the CPRI channels order can also be used.

Figure 13:
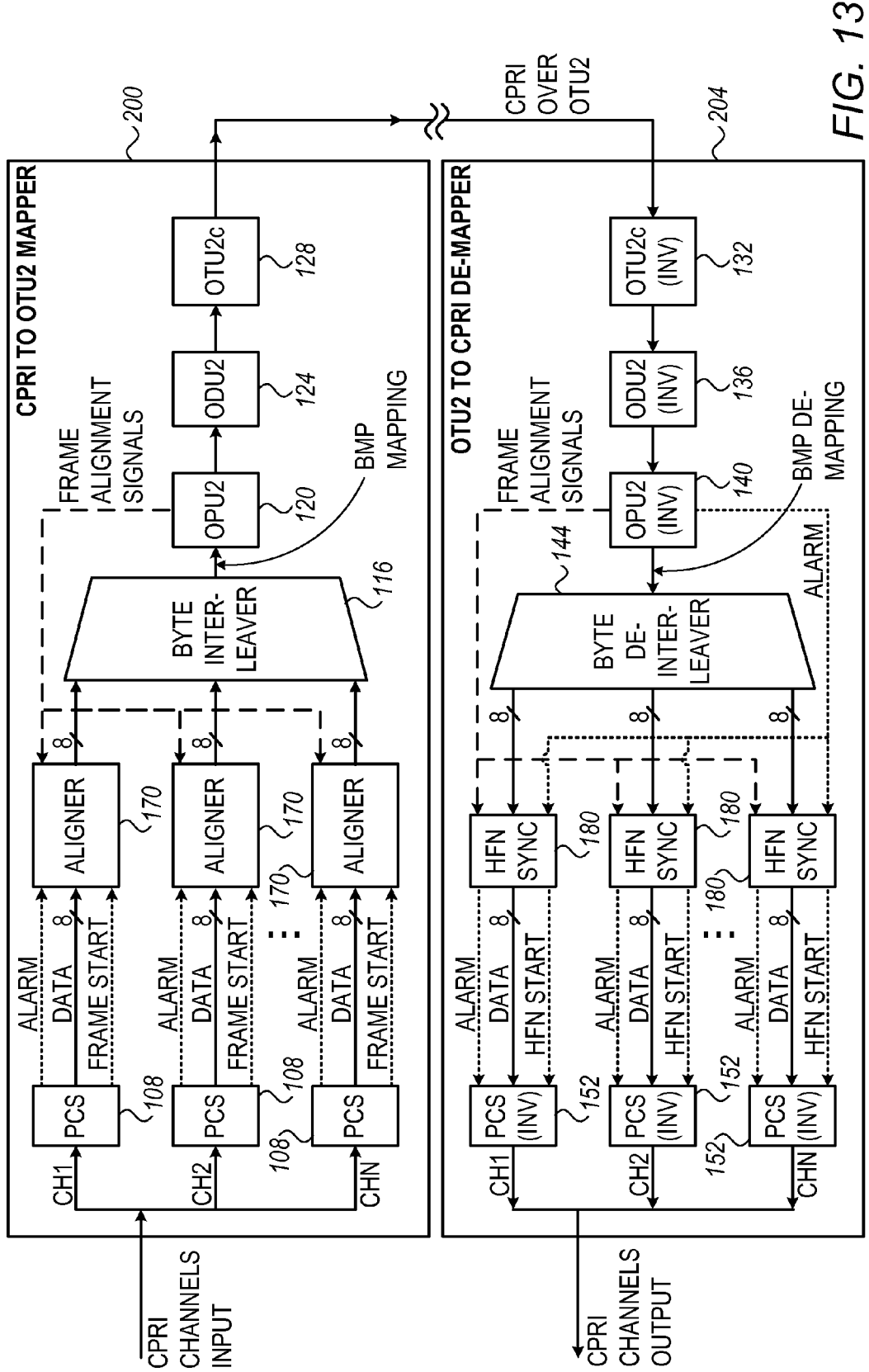
FIG. 13 is a block diagram that schematically illustrates alternative hardware implementations of a CPRI to OTU2 mapper and an OTU2 to CPRI de-mapper, in accordance with an embodiment that is described herein.

FIG. 13 is a block diagram that schematically illustrates alternative hardware implementations of a CPRI to OTU2 mapper and an OTU2 to CPRI de-mapper, in accordance with an embodiment that is described herein.

CPRI to OTU2 mapper 200 and OTU2 to CPRI de-mapper 204 are also simply referred to as mapper 200 and de-mapper 204, for brevity. Mapper 200 and de-mapper 204 can be respectively used, for example, for implementing CPRI to ODUK mapper 70 and ODUK to CPRI de-mapper 74 of FIG. 9 above.

Mapper 200 and de-mapper 204 are built and operate similarly to respective mapper 100 and de-mapper 104 described in FIG. 10 above. Therefore, the description herein mainly focuses on the differences in structure and functionality between the respective implementations.

In mapper 200, aligners 170 replace FIFOs 122 of mapper 100. Based on frame alignment signals from OPU2 units 120, aligners 170 delay the incoming bytes of the CPRI channels so as to enable byte interleaver 116 and OPU2 unit 120 to map the CPRI basic frames of the CPRI channels aligned to the boundaries of the OPU2 structures, as described, for example, in FIGS. 11 and 12 above.

In de-mapper 204, a HFN synchronizer 180 has a different functionality compared to HFN synchronizer 148 of FIG. 10 above. In some embodiments, since the CPRI basic frame are aligned to the OPU2 structure boundaries, HFN synchronizer 180 synchronizes to the CPRI basic frames by identifying the first CPRI basic frame in an OPU2 structure at a predefined offset from the respective OMFI byte.

The configurations of mapper 200 and de-mapper 204 in FIG. 13 are example configurations, which are chosen purely for the sake of conceptual clarity. In alternative embodiments, any other suitable configurations can also be used. Implementation alternatives for mapper 200 and de-mapper 204 are similar to those described for mapper 100 and de-mapper 104 above.

The configurations of BBU interface 44 and RRH interface 48 in FIG. 9, mapper 100 and de-mapper 104 in FIG. 10, and mapper 200 and de-mapper 204 in FIG. 13 are example configurations, which are chosen purely for the sake of conceptual clarity. In alternative embodiments, any other suitable configurations can also be used. The different elements of BBU interface 44 and RRH interface 48 such as clock recovery units 78 and 86, up/down frequency converters 82 and 90 and mapper 70 and de-mapper 74, elements of mappers 100 and 200 such as PCS units 108, aligners 170, FIFOs 112, interleaver 116 and units 120, 124 and 128, as well as the different elements of de-mappers 104 and 204, including units 132, 136 and 140, de-interleaver 144, HFN synchronizers 180 and PCS (inverse) units 152, may be implemented using any suitable hardware, such as in an Application-Specific Integrated Circuit (ASIC) or Field-Programmable Gate Array (FPGA). In some embodiments, some elements of the BBU and RRH interfaces and mappers and de-mappers can be implemented using software, or using a combination of hardware and software elements.

Alternatively, BBU interface 44, RRH interface 48, mapper 100, de-mapper 104, mapper 200 and/or de-mapper 204 comprise a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address mapping CPRI signals, the methods and systems described herein can also be used in other applications in which multiple signals to be mapped are synchronized to the same clock source, such as, for example, in communicating Serial Digital Interface (SDI) video signals.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   receiving in a first communication interface input frames of Common Public Radio Interface (CPRI) signals from multiple CPRI sources, wherein the input frames comprise data symbols that were derived by encoding respective characters, and further comprise one or more synchronization symbols having no corresponding characters;
   recovering the characters from the data symbols, and transmitting the recovered characters to a second communication interface by mapping the characters into communication frames and discarding the synchronization symbols, wherein mapping the characters comprises interleaving the recovered characters using a predefined interleaving scheme that alternates among the multiple CPRI sources;
   extracting the characters from the communication frames in the second communication interface by synchronizing to the input frames independently of the synchronization symbols; and
   reconstructing the input frames in the second communication interface, including the data symbols and the synchronization symbols, by re-encoding the extracted characters.

2. The method according to claim 1, wherein the data symbols carried in the CPRI signals are derived from eight-bit characters using an eight-bit to ten-bit (8b/10b) encoding protocol, and wherein transmitting the recovered characters comprises transmitting the communication frames, with the recovered characters mapped therein, over an optical communication network.

3. The method according to claim 1, wherein mapping the characters comprises mapping the input frames to payload areas of the communication frames, and setting in overhead fields of the communication frames pointers to at least some of the mapped input frames.

4. The method according to claim 3, wherein synchronizing to the input frames comprises identifying respective positions of the input frames within the payload areas of the communication frames using the pointers.

5. The method according to claim 3, wherein receiving the input frames comprises receiving multiple input frames that are organized in a hyper frame, and wherein synchronizing to the input frames comprises identifying an input frame carrying a Hyper Frame Number (HFN), and inferring a position of a first input frame in the hyper frame from a position of the identified input frame within the hyper frame.

6. The method according to claim 5, wherein identifying the input frame comprises dividing the input frames into multiple interleaved sub-sequences each having an intra-frame spacing of a hyper-frame interval, and identifying a sub-sequence in which a field that is expected to contain the HFN increments monotonically and cyclically in a given integer range over two or more of the input frames.

7. The method according to claim 1, wherein discarding the synchronization symbols comprises setting in place of the discarded synchronization symbols respective alarm characters that indicate error events in the CPRI signals, and wherein reconstructing the input frames comprises reconstructing the input frames, including regenerating the synchronization symbols, in response to the alarm characters indicating no errors, and outputting a fault indication otherwise.

8. The method according to claim 1, wherein mapping the characters comprises mapping the input frames aligned to boundaries of the communication frames, and wherein synchronizing to the input frames comprises extracting the characters from the communication frames starting at the boundaries.

9. The method according to claim 1, and comprising deriving from opposite-direction communication frames received in the first communication interface a first clock signal, and transmitting the communication frames using the first clock.

10. The method according to claim 1, and comprising deriving from opposite-direction input frames accepted in the second communication interface a second clock signal, and outputting the reconstructed input frames using the second clock signal.

11. An apparatus for communication, comprising:
a first communication interface, which is configured to receive input frames of Common Public Radio Interface (CPRI) signals from multiple CPRI sources, wherein the input frames comprise data symbols derived by encoding respective characters and further comprise one or more synchronization symbols having no corresponding characters, to recover the characters from the data symbols, and to transmit the recovered characters by mapping the characters into communication frames and discarding the synchronization symbols, wherein mapping the characters comprises interleaving the recovered characters using a predefined interleaving scheme that alternates among the multiple CPRI sources; and
a second communication interface, which is configured to receive the communication frames from the first communication interface, to extract the characters from the communication frames by synchronizing to the input frames independently of the synchronization symbols, and to reconstruct the input frames, including the data symbols and the synchronization symbols, by re-encoding the extracted characters.

12. The apparatus according to claim 11, wherein the data symbols in the CPRI signals are derived from eight-bit characters using an eight-bit to ten-bit (8b/10b) encoding protocol, and wherein the first communication interface is configured to transmit the communication frames, with the recovered characters mapped therein, over an optical communication network.

13. The apparatus according to claim 11, wherein the first communication interface is configured to map the input frames to payload areas of the communication frames, and to set in overhead fields of the communication frames pointers to at least some of the mapped input frames.

14. The apparatus according to claim 13, wherein the second communication interface is configured to synchronize to the input frames by identifying respective positions of the input frames within the payload areas of the communication frames using the pointers.

15. The apparatus according to claim 13, wherein the first communication interface is configured to receive multiple input frames that are organized in a hyper frame, and wherein the second communication interface is configured to identify an input frame carrying a Hyper Frame Number (HFN) and to infer a position of a first input frame in the hyper frame from a position of the identified input frame within the hyper frame.

16. The apparatus according to claim 15, wherein the second communication interface is configured to divide the input frames into multiple interleaved sub-sequences each having an intra-frame spacing of a hyper-frame interval, and to identify a sub-sequence in which a field that is expected to contain the HFN increments monotonically and cyclically in a given integer range over two or more of the input frames.

17. The apparatus according to claim 11, wherein the first communication interface is configured to set in place of the discarded synchronization symbols respective alarm characters that indicate error events in the CPRI signals, and wherein the second communication interface is configured to reconstruct the input frames, including regenerating the synchronization symbols, in response to the alarm characters indicating no errors, and to output a fault indication otherwise.

18. The apparatus according to claim 11, wherein the first communication interface is configured to map the input frames aligned to boundaries of the communication frames, and wherein the second communication interface is configured to synchronize to the input frames by extracting the characters from the communication frames starting at the boundaries.

19. The apparatus according to claim 11, wherein the first communication interface is configured to derive from received opposite-direction communication frames a first clock signal, and to transmit the communication frames using the first clock signal.

20. The apparatus according to claim 11, wherein the second communication interface is configured to derive from accepted opposite-direction input frames a second clock signal, and to output the reconstructed input frames using the second clock signal.

* * * * *